(12) United States Patent
Rhee et al.

(10) Patent No.: US 10,145,624 B2
(45) Date of Patent: Dec. 4, 2018

(54) WAVY FIN, HEAT EXCHANGER HAVING THE SAME, APPARATUS FOR MANUFACTURING THE SAME, METHOD FOR MANUFACTURING THE SAME AND COMPUTER RECORDABLE MEDIUM STORING THE METHOD

(71) Applicant: UNIVERSITY OF SEOUL INDUSTRY COOPERATION FOUNDATION, Seoul (KR)

(72) Inventors: Gwang Hoon Rhee, Seoul (KR); Gun Woo Kim, Seoul (KR)

(*) Notice: Subject to any disclaimer, the term of this patent is extended or adjusted under 35 U.S.C. 154(b) by 33 days.

(21) Appl. No.: 15/132,224

(22) Filed: Apr. 18, 2016

(65) Prior Publication Data
US 2016/0305720 A1 Oct. 20, 2016

(30) Foreign Application Priority Data
Apr. 16, 2015 (KR) .................. 10-2015-0053891

(51) Int. Cl.
F28F 1/12 (2006.01)
F28F 3/02 (2006.01)
B33Y 80/00 (2015.01)

(52) U.S. Cl.
CPC .............. *F28F 1/126* (2013.01); *F28F 3/025* (2013.01); *B33Y 80/00* (2014.12); *F28F 2200/00* (2013.01); *F28F 2215/10* (2013.01)

(58) Field of Classification Search
CPC ........ F28F 1/126; F28F 3/025; F28F 2200/00; F28F 2215/10; F28F 13/12; B33Y 10/00
(Continued)

(56) References Cited

U.S. PATENT DOCUMENTS 1,553,093 A * 9/1925 Modine ............... F28F 1/32
165/151
4,272,462 A * 6/1981 Butt .................. F28D 5/02
165/166
(Continued)

FOREIGN PATENT DOCUMENTS

JP 01-170881 12/1989
KR 10-2013-0059784 6/2013
KR 10-1299072 8/2013

OTHER PUBLICATIONS

English translation of 10-2013-0059784.
English translation of 10-1299072.
English translation of 01-170881.

*Primary Examiner* — Justin Jonaitis
(74) *Attorney, Agent, or Firm* — Antonio Ha & U.S. Patent, LLC

(57) ABSTRACT

Disclosed herein are a wavy fin, a heat exchanger having the same, an apparatus for manufacturing the same, a method of manufacturing the same, and a computer-readable recording medium storing the method. The wavy fin is configured such that top and bottom parts are alternately formed in a width direction while being connected by side parts, and the top, bottom, and side parts extend in a longitudinal direction so as to form a wave such that ridges and valleys are alternately repeated, and includes a front part in front of each ridge or valley of the wave in the longitudinal direction, and a rear part beyond the ridge or valley of the wave in the longitudinal direction. The front and rear parts are offset from each other in the width direction so as to be misaligned at the ridge or valley of the wave.

3 Claims, 21 Drawing Sheets

(58) Field of Classification Search
USPC .................................... 165/185, 152, 166
See application file for complete search history.

(56) References Cited

U.S. PATENT DOCUMENTS

| | | | | |
|---|---|---|---|---|
| 5,625,229 | A * | 4/1997 | Kojima | F28F 3/025 257/712 |
| 7,475,719 | B2 * | 1/2009 | Derosier | F28D 1/0477 165/151 |
| 2002/0007935 | A1 * | 1/2002 | Marsala | F25B 39/022 165/80.2 |
| 2002/0011331 | A1 * | 1/2002 | Lehman | F25J 5/002 165/166 |
| 2002/0153131 | A1 * | 10/2002 | Sugawara | F28D 1/0316 165/173 |
| 2003/0164233 | A1 * | 9/2003 | Wu | F28D 1/0308 165/166 |
| 2005/0274501 | A1 * | 12/2005 | Agee | F28D 9/0062 165/146 |

* cited by examiner

FIG. 9
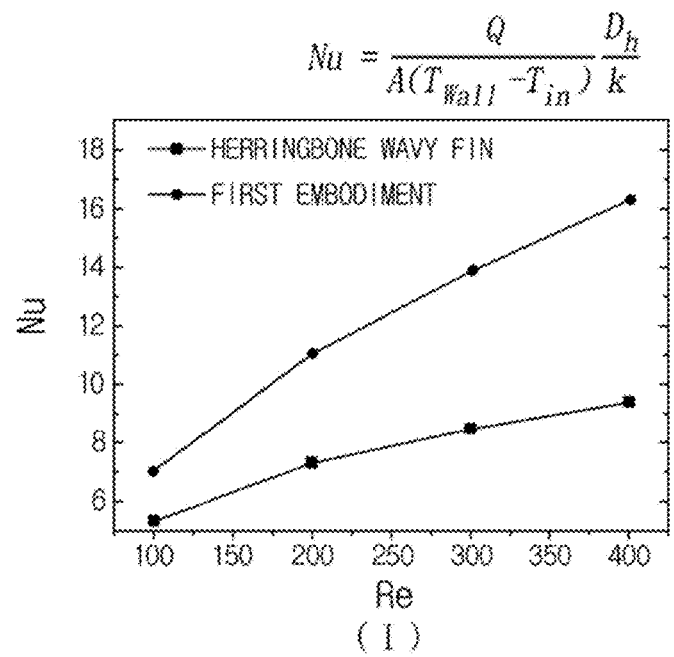
(I)
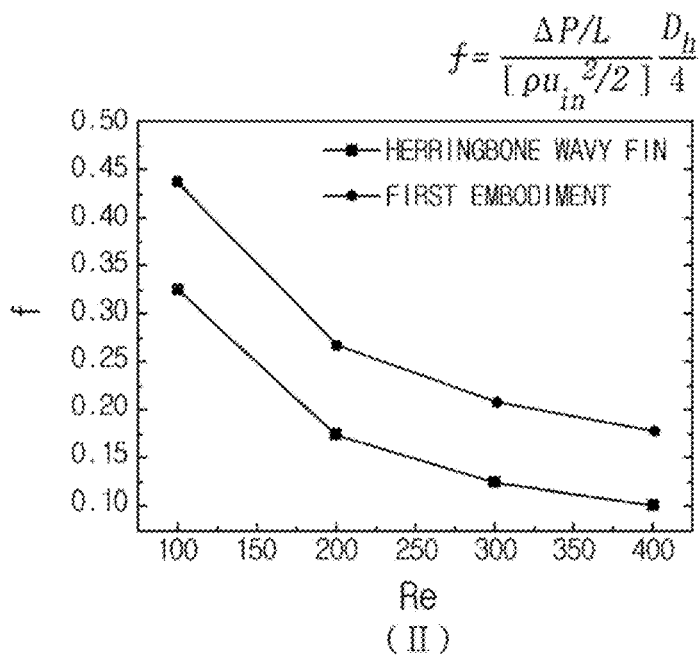
(II)

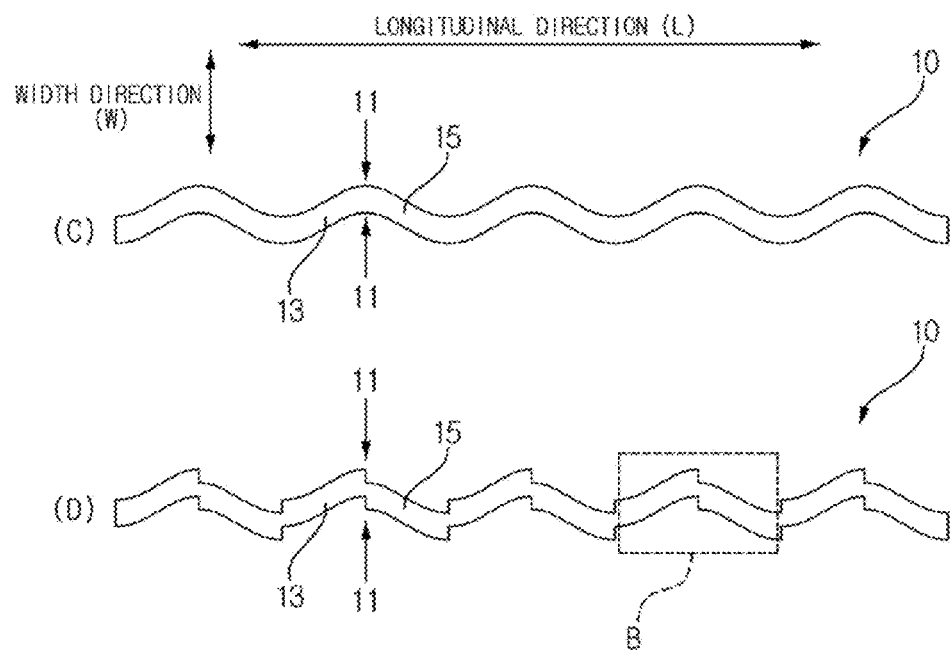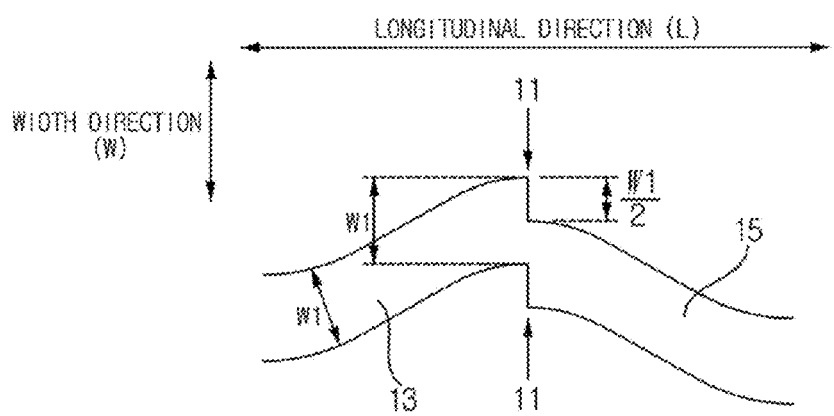

FIG. 13
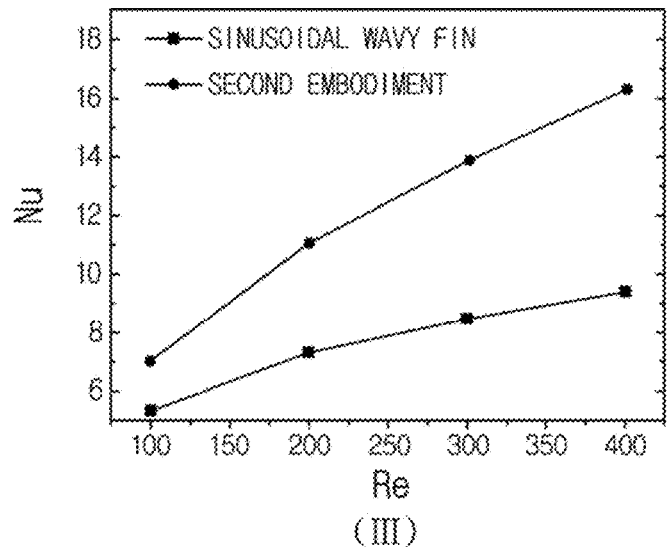
(III)
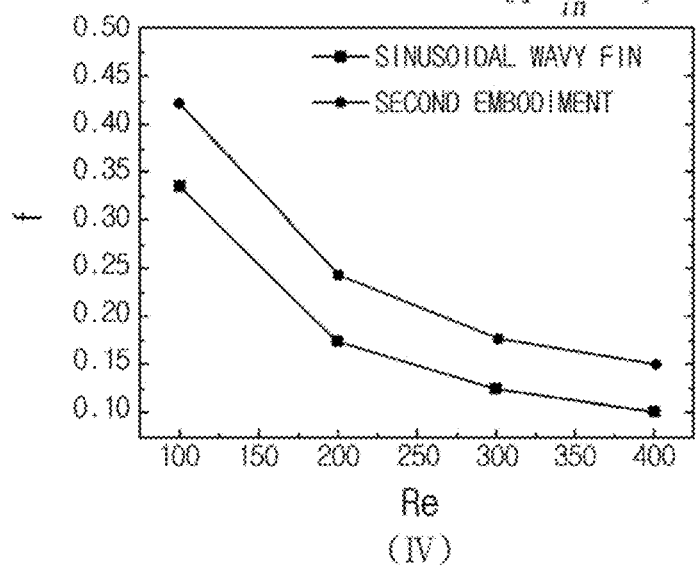
(IV)

FIG. 19
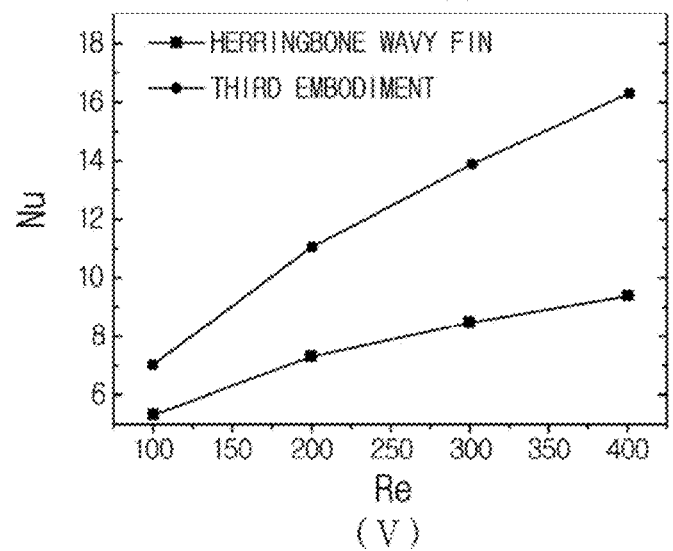
(V)
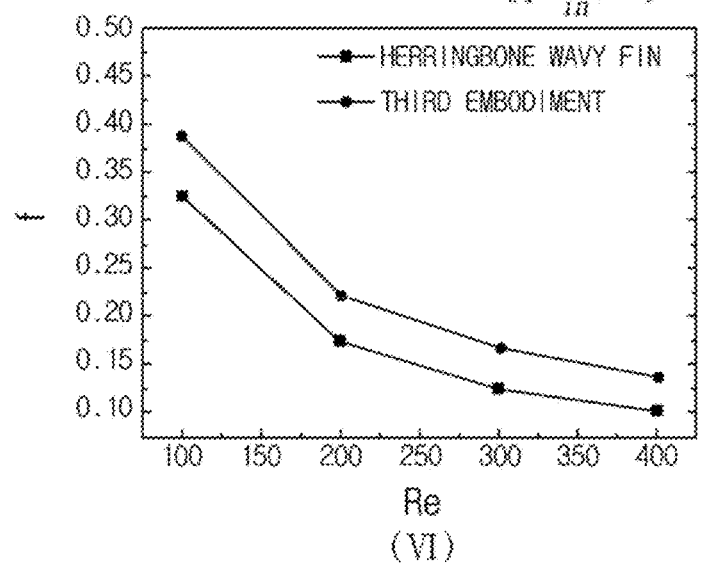
(VI)

FIG. 22
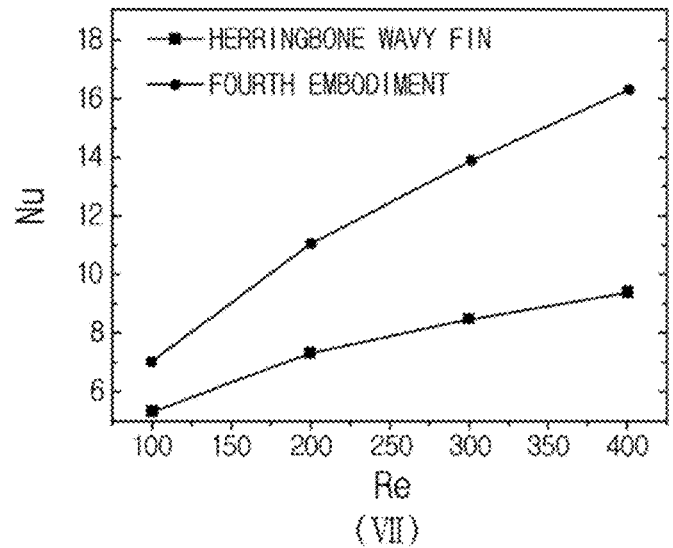
(VII)
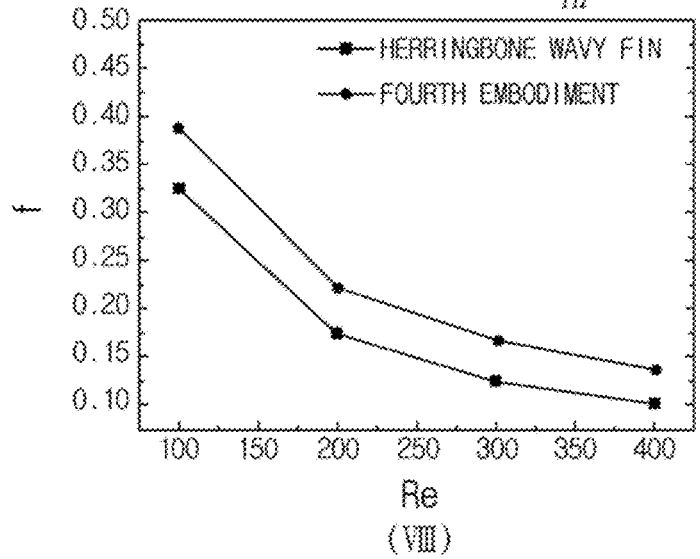
(VIII)

FIG. 25
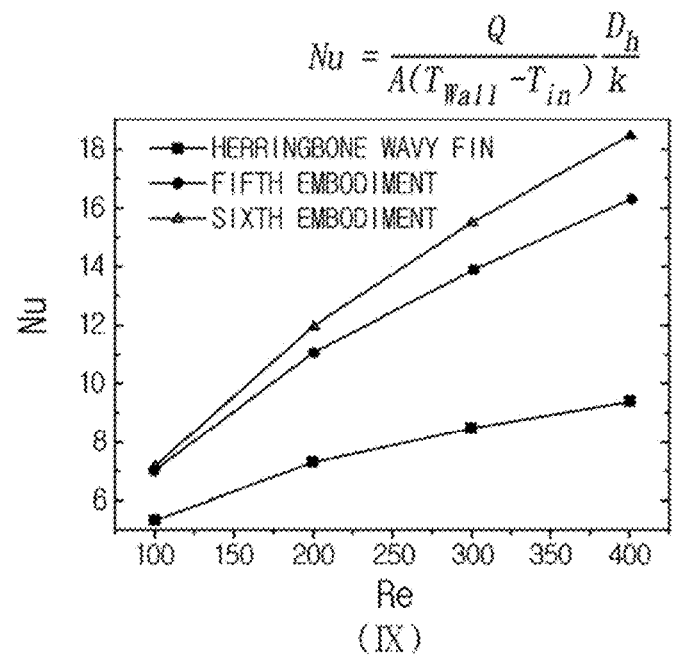
(IX)
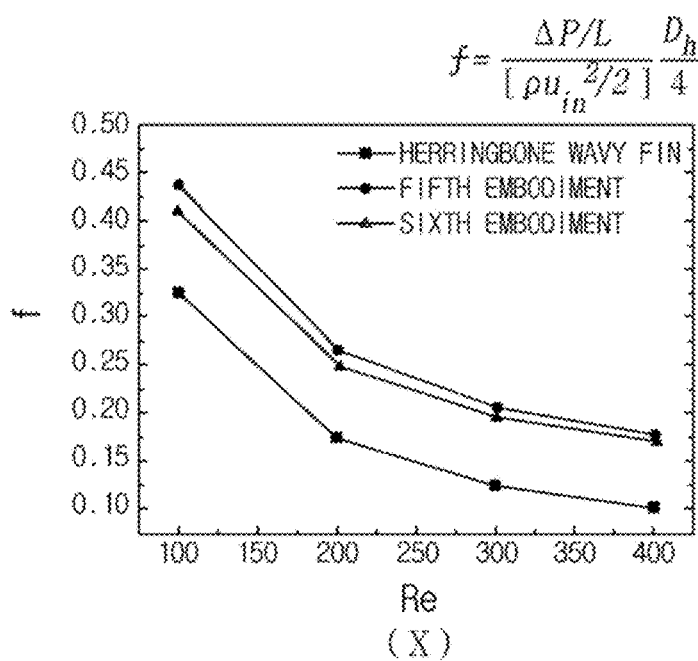
(X)

FIG. 28
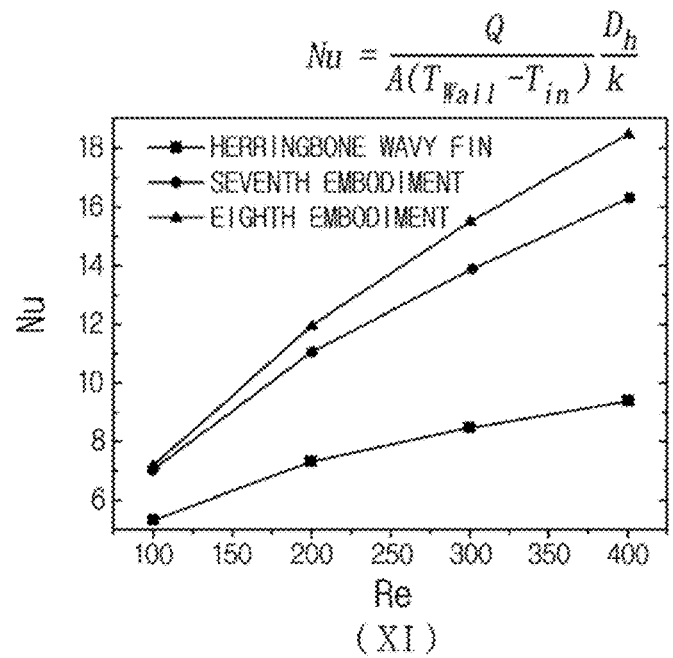
(XI)
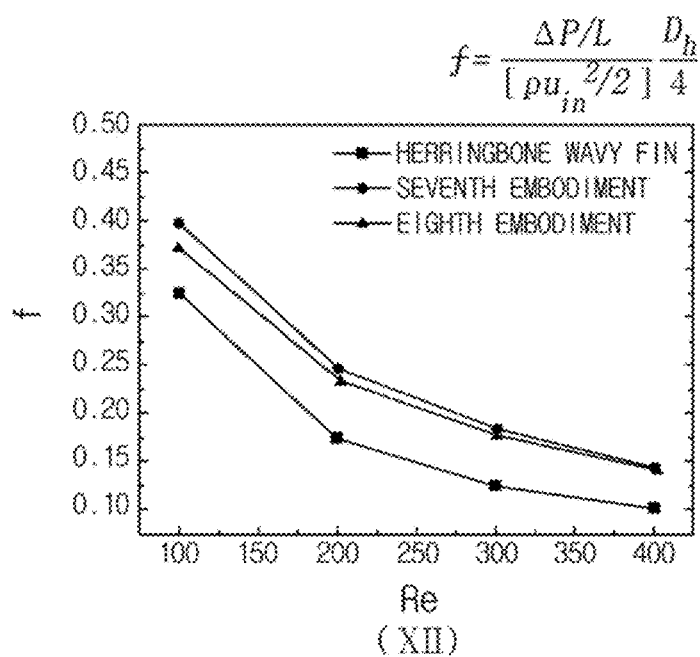
(XII)

WAVY FIN, HEAT EXCHANGER HAVING THE SAME, APPARATUS FOR MANUFACTURING THE SAME, METHOD FOR MANUFACTURING THE SAME AND COMPUTER RECORDABLE MEDIUM STORING THE METHOD

BACKGROUND OF THE INVENTION

Field of the Invention

The present invention relates to a wavy fin, and more particularly to a wavy fin capable of further improving heat exchange between fluids, a heat exchanger having the same, an apparatus for manufacturing the same, a method of manufacturing the same, and a computer-readable recording medium storing the method.

Description of the Related Art

Heat exchangers are devices which exchange heat between two different fluids partitioned by a solid wall, and have been widely used in the industrial fields of heating, air conditioning, power generation, waste heat recovery, chemical process, etc. Although there are a variety of heat exchangers, fin-type heat exchangers have been widely used since they have a simple structure and are easily manufactured. In order to improve the heat transfer performance of fin-type heat exchangers, studies into variation in the shape of a working fluid-side fin blade are ongoing, and compact heat exchangers developed to date that have small and light features include a louvered fin-type heat exchanger, an offset strip fin-type heat exchanger, a wavy fin-type heat exchanger, etc.

A wavy fin is more easily manufactured than other high-performance fins, and is likely to be applied to a fin-flat tube-type heat exchanger. The wavy fin is manufactured by corrugating a typical plain fin in the flow direction to thereby increase the size of a heat transfer surface, and improves heat transfer performance by forming a dynamic flow. In addition, the wavy fin-type heat exchanger can be used in various environments since it has high heat transfer performance and is less influenced by dust adherence.

The flow in the wavy fin is dynamically formed while flowing along the corrugated shape of the fin, and is classified into a laminar zone, an abnormal zone in which longitudinal vortices occur, and a turbulent zone. The wavelength, the angle of bending, the distance between fins, and the like are known as critical geometric parameters affecting the performance of the wavy fin.

[Patent Document 1] Korean Patent Laid-open Publication No. 2013-0059784, published on Jun. 7, 2013 (entitled "wave fin")

SUMMARY OF THE INVENTION

Therefore, the present invention has been made in view of the above problems, and it is an object of the present invention to provide a wavy fin capable of further improving heat transfer performance through the structural change thereof, a heat exchanger having the same, and a method of manufacturing the same.

In accordance with an aspect of the present invention, the above and other objects can be accomplished by the provision of a wavy fin configured such that a plurality of top and bottom parts forming ridges and valleys are alternately formed in a width direction while being connected by a plurality of side parts, and the top parts, the bottom parts, and the side parts extend in a longitudinal direction so as to form a wave such that ridges and valleys are alternately repeated. The wavy fin includes a front part as a region in front of each ridge or valley of the wave in the longitudinal direction, and a rear part as a region beyond the ridge or valley of the wave in the longitudinal direction, and the front and rear parts are offset from each other in the width direction so as to be misaligned at the ridge or valley of the wave.

The front part or the rear part may include a reduction part formed rearward from the ridge or valley of the wave by a predetermined length parallel to the longitudinal direction.

The front part or the rear part may include a reduction part formed forward from the ridge or valley of the wave by a predetermined length parallel to the longitudinal direction.

One of the front and rear parts may be offset from the other within a width between adjacent side parts.

One of the front and rear parts may be offset from the other by ½ of a width between adjacent side parts.

One of the front and rear parts may be offset from the other by ⅓ of a width between adjacent side parts.

The wave shape may be one of a herringbone shape and a sinusoidal shape.

In accordance with another aspect of the present invention, there is provided a heat exchanger including the wavy fin according to the above aspect of the present invention.

In accordance with a still another aspect of the present invention, a modeling apparatus for manufacture of a wavy fin includes an input unit to receive input from a user, and a control unit allowing a wavy fin to be formed as a wavy fin model as a three-dimensional image in response to the input, the wavy fin being configured such that a plurality of top and bottom parts forming respective ridges and valleys are alternately formed in a width direction while being connected by side parts, the top parts, the bottom parts, and the side parts extending in a longitudinal direction so as to form a wave such that ridges and valleys are alternately repeated, the wavy fin including a front part as a region in front of each ridge or valley of the wave in the longitudinal direction, and a rear part as a region beyond the ridge or valley of the wave in the longitudinal direction, the front and rear parts being offset from each other in the width direction so as to be misaligned at the ridge or valley of the wave.

The control unit may allow the wavy fin model to be formed such that the front part or the rear part includes a reduction part formed rearward from the ridge or valley of the wave by a predetermined length parallel to the longitudinal direction.

The control unit may allow the wavy fin model to be formed such that the front part or the rear part includes a reduction part formed forward from the ridge or valley of the wave by a predetermined length parallel to the longitudinal direction.

The control unit may determine the degree of offset using the following Equation:

$$\frac{W1}{x},$$

where W1 is a width between a pair of side parts of a unit fin, and x is a positive integer.

In accordance with a yet another aspect of the present invention, an additive manufacturing apparatus for manufacture of a wavy fin includes providing a wavy fin model in which a wavy fin is formed as a three-dimensional image, the wavy fin being configured such that a plurality of top and bottom parts forming respective ridges and valleys are alternately formed in a width direction while being connected by side parts, the top parts, the bottom parts, and the side parts extending in a longitudinal direction so as to form a wave such that ridges and valleys are alternately repeated, the wavy fin including a front part as a region in front of each ridge or valley of the wave in the longitudinal direction, and a rear part as a region beyond the ridge or valley of the wave in the longitudinal direction, the front and rear parts being offset from each other in the width direction so as to be misaligned at the ridge or valley of the wave, and forming the wavy fin according to the wavy fin model in an additive manufacturing manner.

In accordance with a still yet another aspect of the present invention, a method of manufacturing a wavy fin using a modeling apparatus includes forming a wavy fin model in which a wavy fin is formed as a three-dimensional image, the wavy fin being configured such that a plurality of top and bottom parts forming respective ridges and valleys are alternately formed in a width direction while being connected by side parts, the top parts, the bottom parts, and the side parts extending in a longitudinal direction so as to form a wave such that ridges and valleys are alternately repeated, the wavy fin including a front part as a region in front of each ridge or valley of the wave in the longitudinal direction, and a rear part as a region beyond the ridge or valley of the wave in the longitudinal direction, and offsetting the front and rear parts from each other in the width direction such that the front and rear parts are misaligned at the ridge or valley of the wave in the wavy fin model.

The method may further include forming the wavy fin model such that the front part or the rear part includes a reduction part formed rearward from the ridge or valley of the wave by a predetermined length parallel to the longitudinal direction.

The method may further include forming the wavy fin model such that the front part or the rear part includes a reduction part formed forward from the ridge or valley of the wave by a predetermined length parallel to the longitudinal direction.

In the offsetting the front and rear parts, the degree of offset may be determined using the following Equation:

$$\frac{W1}{x},$$

where W1 is a width between a pair of side parts of a unit fin, and x is a positive integer.

In accordance with a further aspect of the present invention, a method of manufacturing a wavy fin using an additive manufacturing apparatus includes providing a wavy fin model in which a wavy fin is formed as a three-dimensional image, the wavy fin being configured such that a plurality of top and bottom parts forming respective ridges and valleys are alternately formed in a width direction while being connected by side parts, the top parts, the bottom parts, and the side parts extending in a longitudinal direction so as to form a wave such that ridges and valleys are alternately repeated, the wavy fin including a front part as a region in front of each ridge or valley of the wave in the longitudinal direction, and a rear part as a region beyond the ridge or valley of the wave in the longitudinal direction, the front and rear parts being offset from each other in the width direction so as to be misaligned at the ridge or valley of the wave, and forming the wavy fin equal to the wavy fin model in an additive manufacturing manner.

In accordance with a still further aspect of the present invention, there is provided a computer-readable recording medium storing a program to execute the method of manufacturing a wavy fin using a modeling apparatus according to the above aspect of the present invention.

In accordance with a yet further aspect of the present invention, there is provided a computer-readable recording medium storing a program to execute the method of manufacturing a wavy fin using an additive manufacturing apparatus according to the above aspect of the present invention.

BRIEF DESCRIPTION OF THE DRAWINGS

The above and other objects, features and other advantages of the present invention will be more clearly understood from the following detailed description taken in conjunction with the accompanying drawings, in which:

FIG. 9 is a graph for explaining heat transfer performance depending on a flow of fluid in the wavy fin according to the first embodiment of the present invention;

FIG. 10 is a view for explaining a wavy fin according to a second embodiment of the present invention;

FIG. 11 is an enlarged view illustrating portion "B" of FIG. 10;

FIG. 13 is a graph for explaining heat transfer performance depending on a flow of fluid in the wavy fin according to the second embodiment of the present invention;

FIG. 19 is a graph for explaining heat transfer performance depending on a flow of fluid in the wavy fin according to the third embodiment of the present invention;

FIG. 22 is a graph for explaining heat transfer performance depending on a flow of fluid in the wavy fin according to the fourth embodiment of the present invention;

FIG. 25 is a graph for explaining heat transfer performance depending on a flow of fluid in the wavy fins according to the fifth and sixth embodiments of the present invention;

FIG. 28 is a graph for explaining heat transfer performance depending on a flow of fluid in the wavy fins according to the seventh and eighth embodiments of the present invention;

DETAILED DESCRIPTION OF THE INVENTION

Prior to the description, it is noted that the terms and words used in the present specification and claims should not be construed as being limited to common or dictionary meanings but instead should be understood to have meanings and concepts in agreement with the spirit of the present invention based on the principle that an inventor can define the concept of each term suitably in order to describe his/her own invention in the best way possible. Accordingly, since the embodiments described in the present specification are nothing but one preferred embodiment of the present invention and it does not cover all the technical ideas of the invention, it should be understood that various changes and modifications may be made at the time of filing the present application.

Reference will now be made in detail to the preferred embodiments of the present invention, examples of which are illustrated in the accompanying drawings. It should be noted that, wherever possible, the same reference numbers are used throughout the drawings to refer to the same or like parts. In certain embodiments, detailed descriptions of device constructions or processes well known in the art may be omitted to avoid obscuring appreciation of the disclosure by a person of ordinary skill in the art. The drawings are not necessarily to scale and in some instances, proportions may have been exaggerated in order to clearly illustrate features of the embodiments.

Figure 1:
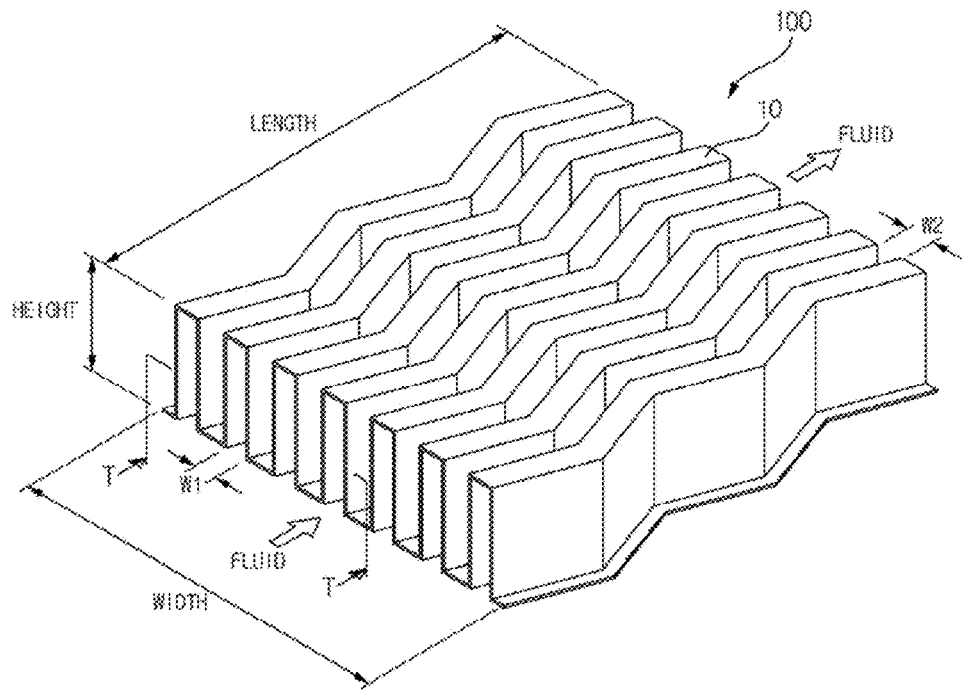
FIG. 1 is a perspective view illustrating a wavy fin.
Figure 2:
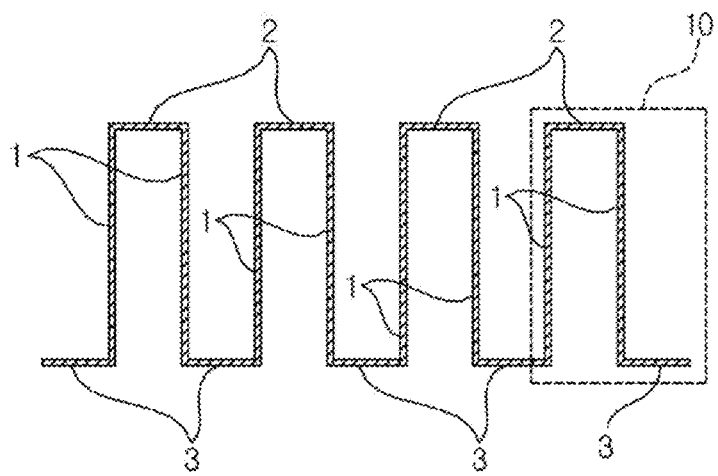
FIG. 2 is a cross-sectional view taken along line "T-T" of FIG. 1.
Figure 3:
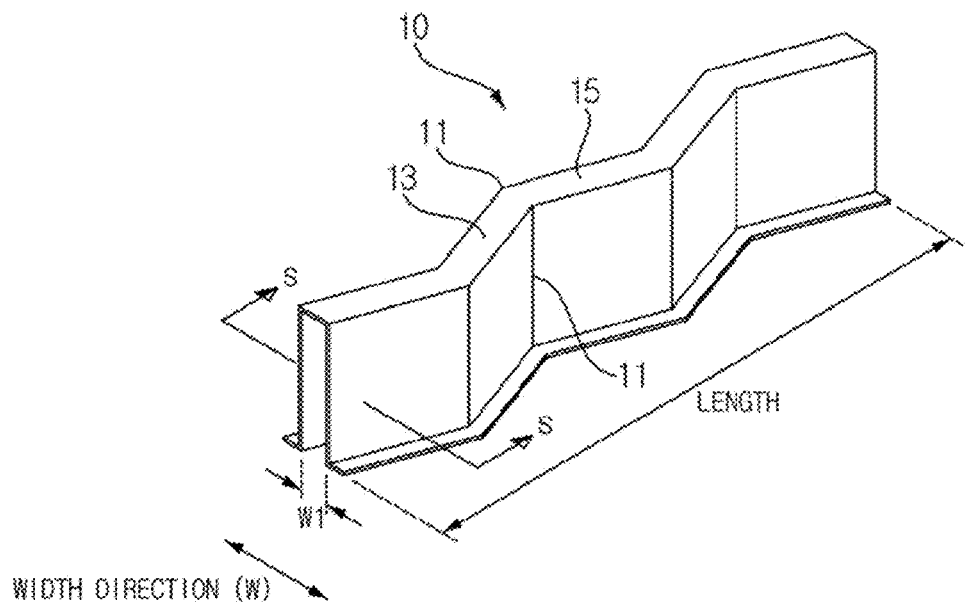
FIG. 3 is a perspective view illustrating a portion of the wavy fin of FIG. 1.
Figure 4:
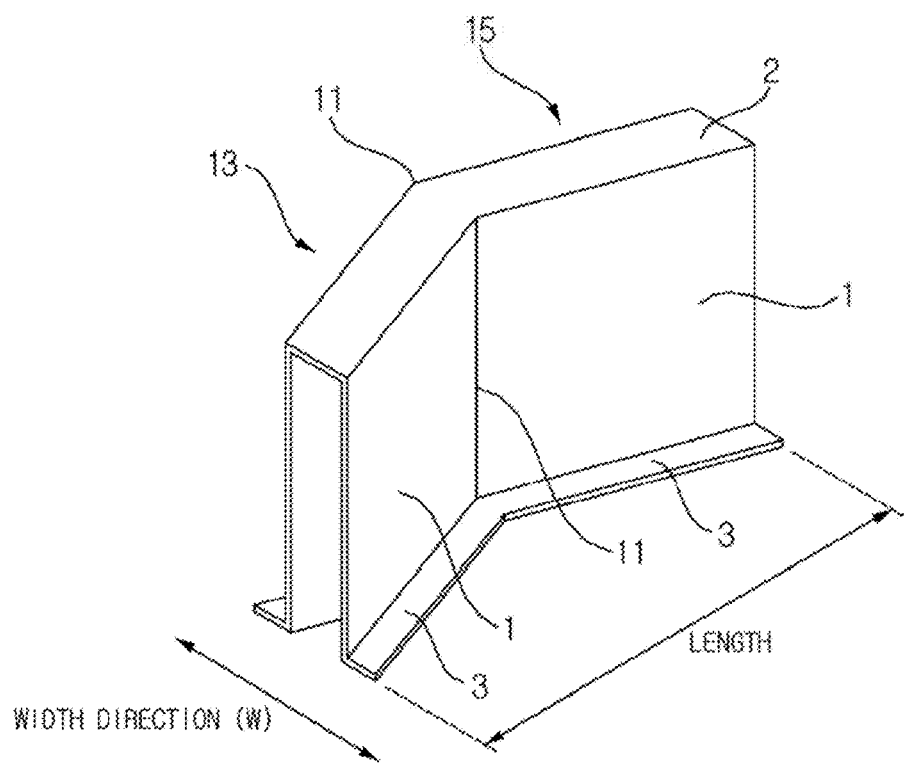
FIG. 4 is a perspective view illustrating only one front part and one rear part in FIG. 3.

A wavy fin is a means for heat exchange. That is, when a flow of fluid is guided to the wavy fin, heat exchange occurs between the fluid and the wavy fin. Accordingly, a heat exchanger includes a means for guiding a flow of fluid between a wavy fin and another wavy fin. A heat exchanger according to an embodiment of the present invention includes at least one wavy fin, and may have various types of fins according to the purpose thereof. Accordingly, it is to be understood that the heat exchanger including at least one wavy fin according to the embodiment of the present invention falls within the spirit and scope of the present disclosure defined in the appended claims. Hereinafter, the structure of the wavy fin according to the embodiment of the present invention will be described. FIG. 1 is a perspective view illustrating the wavy fin. FIG. 2 is a cross-sectional view taken along line "T-T" of FIG. 1. FIG. 3 is a perspective view illustrating a portion of the wavy fin of FIG. 1. FIG. 4 is a perspective view illustrating only one front part and one rear part in FIG. 3.

Referring to FIGS. 1 to 4, the wavy fin, which is designated by reference numeral 100, has a corrugated shape in a width direction (W) in order to increase the contact surface with fluid in a limited space. In more detail, the wavy fin 100 is configured such that top parts 2 forming ridges and bottom parts 3 forming valleys are alternately formed in the width direction (W), and the top parts 2 and the bottom parts 3 are connected by a plurality of side parts 1. In other words, the wavy fin 100 has the side parts 1, which are vertically formed while being spaced apart from each other by a predetermined width in the width direction (W), and the top parts 2, which connect the upper ends of the side parts 1 in the width direction (W), and the bottom parts 3, which connect the lower ends of the side parts 1, are alternately formed. In addition, the wavy fin 100 is configured such that the side parts 1, the top parts 2, and the bottom parts 3 extend in a longitudinal direction (L) so as to form a wave such that ridges 11 and valleys 11 are alternately repeated. In the embodiment of the present invention, this wave shape includes a herringbone shape and a sinusoidal shape. A fluid flows in the longitudinal direction (L) of the wavy fin 100. Thus, the side parts 1 partition the flow path of fluid. Heat exchange occurs through contact between the flowing fluid and the wavy fin 100.

In the embodiment of the present invention, the region in front of each valley or ridge 11 of the wave in the longitudinal direction thereof is referred to as a front part 13, and the region beyond the valley or ridge 11 of the wave in the longitudinal direction thereof is referred to as a rear part 15. In connection with the front part 13 and the rear part 15, it will be understood that the front part 13 may be a rear part and the rear part 15 may be a front part, based on the valley or ridge 11.

Meanwhile, for convenience of description, the form in which a pair of side parts 1, one top part 2, and one bottom part 3 extend in the longitudinal direction is referred to as one unit fin 10, as illustrated in FIG. 3. On the basis of the structure of the above-mentioned wavy fin 100, wavy fins according to various embodiments of the present invention will be described. In this case, each embodiment will be described using a cross section corresponding to the cross section taken along line "S-S" of FIG. 3. That is, each embodiment will be described using the longitudinal cross-section of the unit fin 10 in the wavy fin 100.

Figure 5:
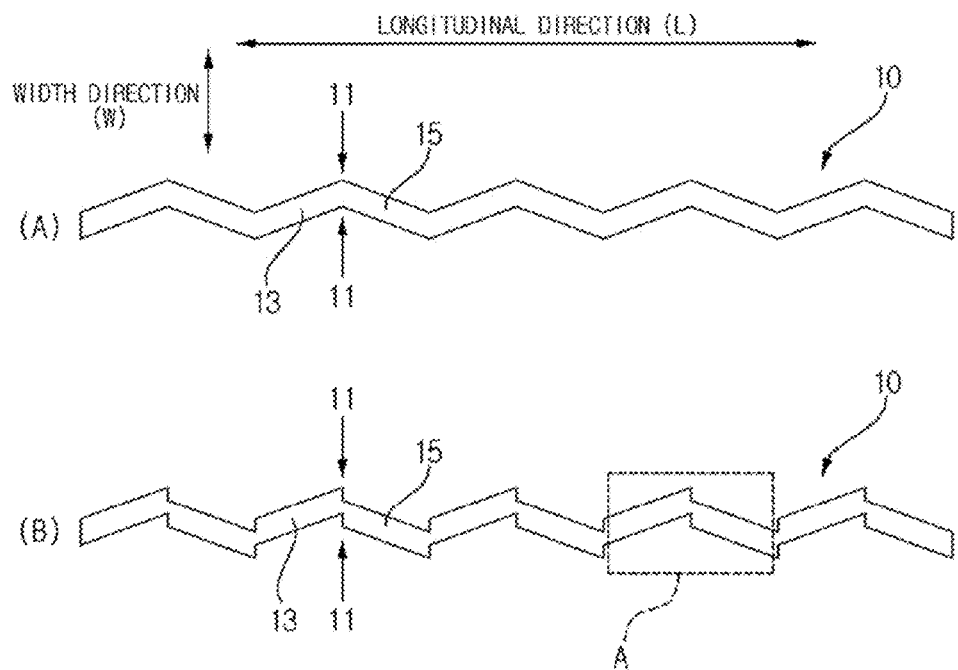
FIG. 5 is a view for explaining a wavy fin according to a first embodiment of the present invention.
Figure 6:
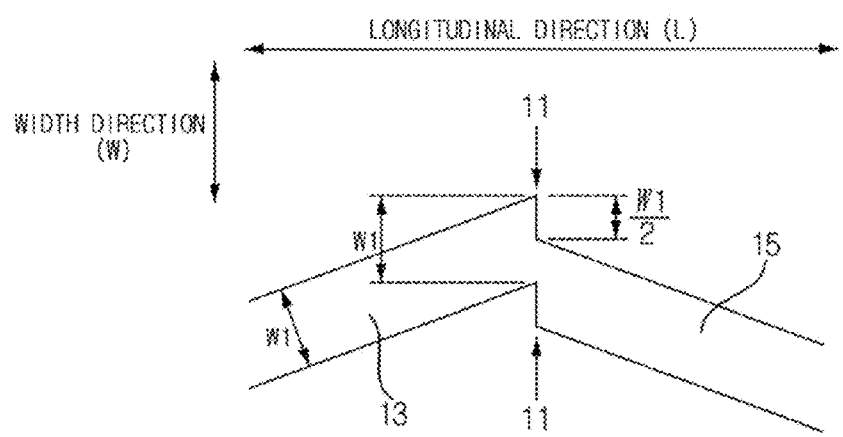
FIG. 6 is an enlarged view illustrating portion "A" of FIG. 5.

First, a wavy fin 100 according to a first embodiment of the present invention will be described. FIG. 5 is a view for explaining the wavy fin according to the first embodiment of the present invention. FIG. 6 is an enlarged view illustrating portion "A" of FIG. 5.

FIG. 5(A) illustrates the longitudinal cross-section (corresponding to the cross section taken along line "S-S" of FIG. 3) of a herringbone wavy fin. FIG. 5(B) illustrates the longitudinal cross-section (corresponding to the cross section taken along line "S-S" of FIG. 3) of a herringbone wavy fin 100 according to the first embodiment of the present invention. As illustrated in FIGS. 5(A) and 5(B), both of the wavy fins 100 form a herringbone wave such that a plurality of valleys and ridges 11 is periodically repeated in a longitudinal direction (L). However, the wavy fin 100 according to the first embodiment has a herringbone shape and a front part 13 and a rear part 15 are connected to each other while being misaligned at each of the valleys or ridges 11, as illustrated in FIGS. 5(B) and 6. That is, the front and rear parts 13 and 15 according to the first embodiment are offset from each other in a width direction (W) perpendicular to the longitudinal direction. For example, as illustrated in FIG. 6, when the width between adjacent side parts 1 is W1, the rear part 15 may be offset from the front part 13 by W1/2 in the width direction (W).

Meanwhile, in the wavy fin 100 configured such that top parts 2, bottom parts 3, and side parts 1 extend in a longitudinal direction (L) so as to form a wave such that ridges 11 and valleys 11 are alternately repeated, the front and rear part 13 and 15 are offset from each other in the width direction so as to be misaligned at each of the ridges or valleys 11 of the wave. In this case, when a rear part 15 at any one of the ridges or valleys 11 is offset to the left in the width direction, a rear part 15 at a valley or ridge adjacent to the ridge or valley 11 may be offset to the right in the width direction. This is similarly applied to second to eighth embodiments, which will be described later, as well as the first embodiment.

Figure 7:
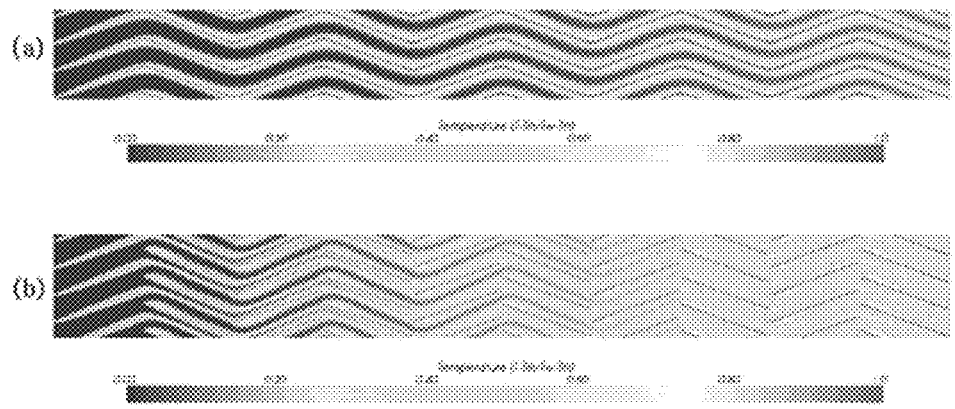
FIGS. 7 and 8 are views for explaining the heat transfer performance of the wavy fin according to the first embodiment of the present invention.
Figure 8:
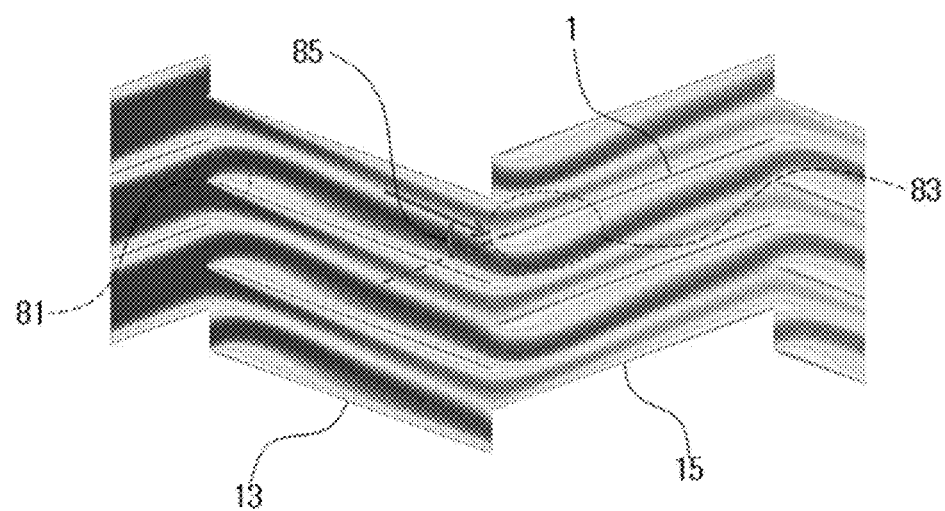

FIGS. 7 and 8 are views for explaining the heat transfer performance of the wavy fin according to the first embodiment of the present invention. FIG. 7(a) illustrates a temperature distribution when a fluid flows in the herringbone wavy fin illustrated in FIG. 5(A). For comparison, FIG. 7(b) illustrates a temperature distribution when a fluid flows in the wavy fin 100 having the offset structure, which is described with reference to FIGS. 5(B) and 6 according to the first embodiment, and FIG. 8 is an enlarged view illustrating a portion of FIG. 7(b).

As illustrated in FIG. 7(a), unlike the fluid in contact with side parts, a low-temperature fluid, i.e. a fluid, which is distant from any side part 1 and flows without contact therewith, does not exchange temperature by direct contact with the side part 1. However, in the wavy fin 100 according to the first embodiment, a fluid, which is distant from any side part 1 and flows without contact therewith, comes into direct contact with the side part 1 at an offset position 81 in the associated valley or ridge 11, as illustrated in FIGS. 7(b) and 8. When comparing FIG. 7(a) with FIG. 7(b), it can be seen that heat exchange is actively performed in the first embodiment. Therefore, it can be seen that the herringbone wavy fin 100 according to the first embodiment has higher heat transfer performance than the herringbone wavy fin illustrated in FIG. 5(A).

FIG. 9 is a graph for explaining heat transfer performance depending on a flow of fluid in the wavy fin according to the first embodiment of the present invention. Referring to Graph (I), it can be seen that the Nusselt Number (Nu) in the herringbone wavy fin 100 according to the first embodiment of the present invention illustrated in FIG. 5(A) is increased by 30% at a Reynolds Number (Re) of 100, 52% at a Re of 200, 64% at a Re of 300, and 74% at a Re of 400, compared to that in the herringbone wavy fin illustrated in FIG. 5(A). On the other hand, referring to Graph (II), the pressure drop (f) in the wavy fin 100 according to the first embodiment of the present invention is increased by 35% at a Re of 100, 53% at a Re of 200, 66% at a Re of 300, and 76% at a Re of 400, compared to that in the herringbone wavy fin illustrated in FIG. 5(A). This pressure drop, i.e. pressure loss, occurs due to the generation of a recirculation zone which is designated by reference numeral 83. The recirculation zone 83 is generated because, when the flow of fluid in the front part 13 meets with the side part 1 in the rear part 15, an angle of attack 85 formed by the flow of fluid and the side part 1 is great.

Next, a wavy fin 100 according to a second embodiment of the present invention will be described. FIG. 10 is a view for explaining the wavy fin according to the second embodiment of the present invention. FIG. 11 is an enlarged view illustrating portion "B" of FIG. 10.

FIG. 10(C) illustrates the longitudinal cross-section (corresponding to the cross section taken along line "S-S" of FIG. 3) of one unit fin 10 in a typical sinusoidal wavy fin. FIG. 10(D) illustrates the longitudinal cross-section (corresponding to the cross section taken along line "S-S" of FIG. 3) of a unit fin 10 in a sinusoidal wavy fin 100 according to the second embodiment of the present invention. As illustrated in FIGS. 10(C) and 10(D), both of the unit fins 10 form a wave such that a plurality of valleys and ridges 11 is periodically repeated in a longitudinal direction. However, the wavy fin 100 according to the second embodiment of the present invention has the shape of a sinusoidal fluid passage and a front part 13 and a rear part 15 are connected to each other while being misaligned at each of the valleys or ridges 11, as illustrated in FIGS. 10(D) and 11. That is, the front and rear parts 13 and 15 according to the second embodiment are offset from each other in a width direction (W) perpendicular to the longitudinal direction. For example, as illustrated in FIG. 11, when the width between a pair of side parts is W1, the rear part 15 may be offset from the front part 13 by W1/2 in the width direction (W).

Figure 12:
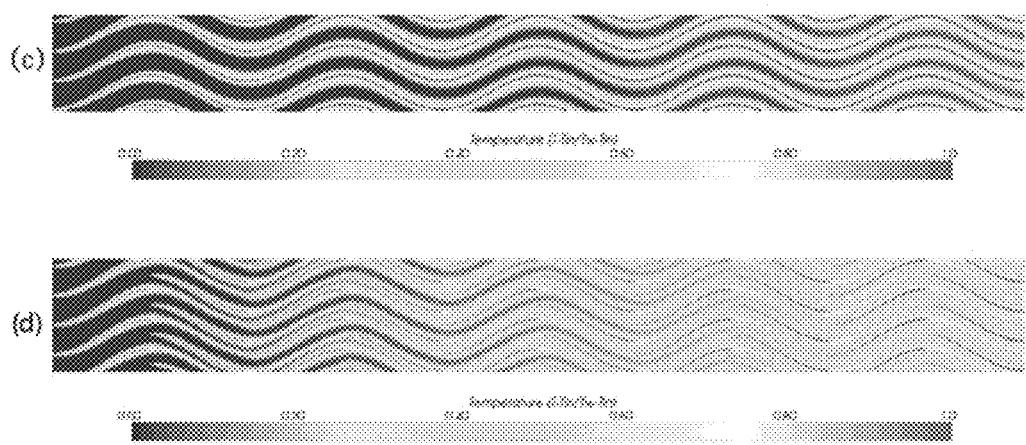
FIG. 12 is a view for explaining the heat transfer performance of the wavy fin according to the second embodiment of the present invention.

FIG. 12 is a view for explaining the heat transfer performance of the wavy fin according to the second embodiment of the present invention. FIG. 12(c) illustrates a temperature distribution when a fluid flows in the sinusoidal wavy fin illustrated in FIG. 10(C). FIG. 12(d) illustrates a temperature distribution when a fluid flows in the wavy fin 100 of the second embodiment illustrated in FIGS. 10(D) and 11.

As illustrated in FIG. 12(c), unlike the fluid in contact with side parts, a low-temperature fluid, i.e. a fluid, which is distant from any side part 1 and flows without contact therewith, does not exchange temperature by direct contact with the side part 1. However, in the wavy fin 100 according to the second embodiment, a fluid, which is distant from any side part 1 and flows without contact therewith, comes into direct contact with the side part 1 in an offset structure formed in the associated valley or ridge 11, as illustrated in FIG. 12(d). When comparing FIG. 12(c) with FIG. 12(d), it can be seen that heat exchange is actively performed in the wavy fin 100 of the second embodiment. Therefore, it can be seen that the wavy fin 100 according to the second embodiment has higher heat transfer performance than the sinusoidal wavy fin illustrated in FIG. 10(C).

FIG. 13 is a graph for explaining heat transfer performance depending on a flow of fluid in the wavy fin according to the second embodiment of the present invention. Referring to Graph (III), it can be seen that the Nusselt Number (Nu) in the wavy fin 100 according to the second embodiment is increased by 31% at a Re of 100, 54% at a Re of 200, 65% at a Re of 300, and 72% at a Re of 400, compared to that in the sinusoidal wavy fin illustrated in FIG. 10(C). On the other hand, referring to Graph (IV), the pressure drop (f) in the wavy fin 100 according to the second embodiment is increased by 24% at a Re of 100, 36% at a Re of 200, 43% at a Re of 300, and 46% at a Re of 400, compared to that in the sinusoidal wavy fin illustrated in FIG. 10(C). Thus, it can be seen that the pressure drop in the second embodiment is lower than that in the first embodiment. This is because an angle of attack is reduced compared to the first embodiment.

Figure 14:
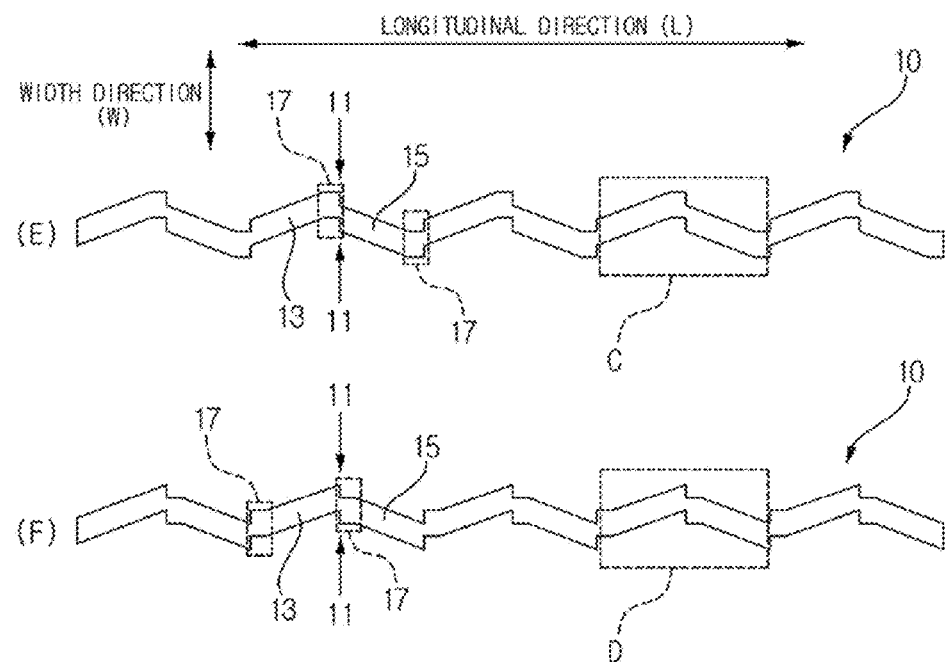
FIG. 14 is a view for explaining wavy fins according to third and fourth embodiments of the present invention.
Figure 15:
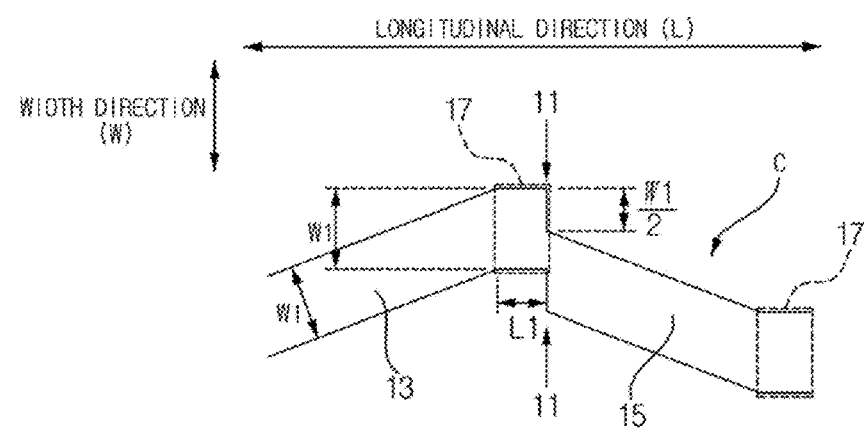
FIG. 15 is an enlarged view illustrating portion "C" of FIG. 14.
Figure 16:
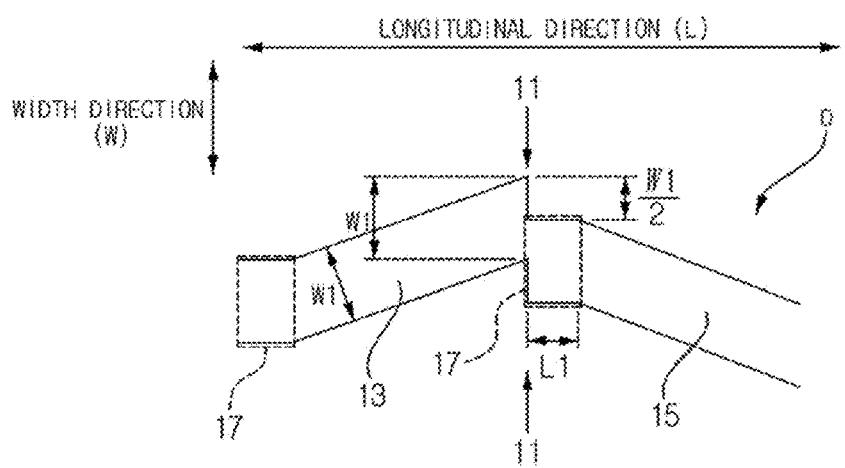
FIG. 16 is an enlarged view illustrating portion "D" of FIG. 14.

Next, wavy fins 100 according to third and fourth embodiments of the present invention will be described. FIG. 14 is a view for explaining the wavy fins according to the third and fourth embodiments of the present invention. FIG. 15 is an enlarged view illustrating portion "C" of FIG. 14. FIG. 16 is an enlarged view illustrating portion "D" of FIG. 14.

FIGS. 14(E) and 15 illustrate the wavy fin 100 according to the third embodiment of the present invention. The wavy fin 100 according to the third embodiment has a herringbone shape. Similar to the first embodiment, the wavy fin 100 of the third embodiment is configured such that a front part 13 and a rear part 15 are offset from each other in a width direction (W) perpendicular to the longitudinal direction so as to be misaligned at each valley or ridge 11. For example, as illustrated in FIG. 15, when the width between a pair of side parts is W1, the rear part 15 may be offset from the front part 13 by W1/2 in the width direction (W).

Additionally, a reduction part 17 is formed in a partial region of the front or rear part 13 or 15 of the wavy fin 100 according to the third embodiment. The reduction part 17 serves to reduce the size of an angle of attack with the side part 1 in the rear part 15 by changing the direction in which fluid flows in the front part 13. The reduction part 17 of the third embodiment is formed in a region in front of the valley or ridge 11, having an offset structure, in the longitudinal direction, i.e. in the front region thereof. For example, the reduction part 17 may have a profile which is formed forward from the valley or ridge 11 by a predetermined length L1 parallel to the longitudinal direction (L). Alternatively, although not illustrated, the reduction part 17 may have a curved profile which is formed forward from the valley or ridge 11 by a predetermined length L1, rather than having the parallel profile. When the profile of the front part 13 is directed forward (right) and upward in the drawing, the curved profile may be convex upward. When the profile of the front part 13 is directed forward (right) and downward in the drawing, the curved profile may be convex downward.

FIGS. 14(F) and 16 illustrate the wavy fin 100 according to the fourth embodiment of the present invention. The wavy fin 100 according to the fourth embodiment has a herringbone shape. Similar to the first embodiment, the wavy fin 100 of the fourth embodiment is configured such that a front part 13 and a rear part 15 are offset from each other in a width direction (W) perpendicular to the longitudinal direction so as to be misaligned at each valley or ridge 11. For example, as illustrated in FIG. 16, when the width between a pair of side parts is W1, the rear part 15 may be offset from the front part 13 by W1/2 in the width direction (W).

Additionally, a reduction part 17 is formed in a partial region of the front or rear part 13 or 15 of the wavy fin 100 according to the fourth embodiment. The reduction part 17 serves to reduce the size of an angle of attack with the flow direction of fluid in the front part 13 relative to the side part 1 in the rear part 15 by changing the direction in which fluid flows in the side part 1 in the rear part 15. The reduction part 17 of the fourth embodiment is formed in a region beyond the valley or ridge 11, having an offset structure, in the longitudinal direction, i.e. in the rear region thereof. The reduction part 17 allows the flow of fluid in the front part 13 to be changed to the rear part 15. For example, the reduction part 17 may have a profile which is formed rearward from the valley or ridge 11 by a predetermined length L1 parallel to the longitudinal direction (L). Alternatively, although not illustrated, the reduction part 17 may have a curved profile which is formed rearward from the valley or ridge 11 by a predetermined length L1, rather than having the parallel profile. When the profile of the front part 13 is directed forward (right) and upward as illustrated in the drawing, the curved profile may be convex upward. When the profile of the front part 13 is directed forward (right) and downward as illustrated in the drawing, the curved profile may be convex downward.

Figure 17:
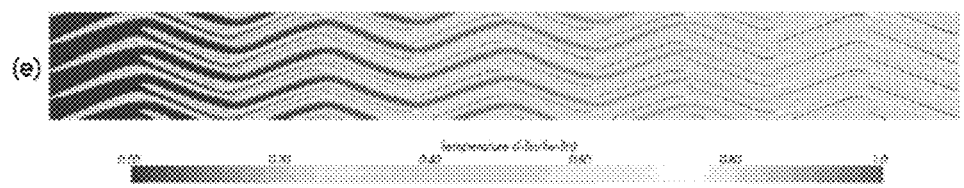
FIGS. 17 and 18 are views for explaining the heat transfer performance of the wavy fin according to the third embodiment of the present invention.
Figure 18:
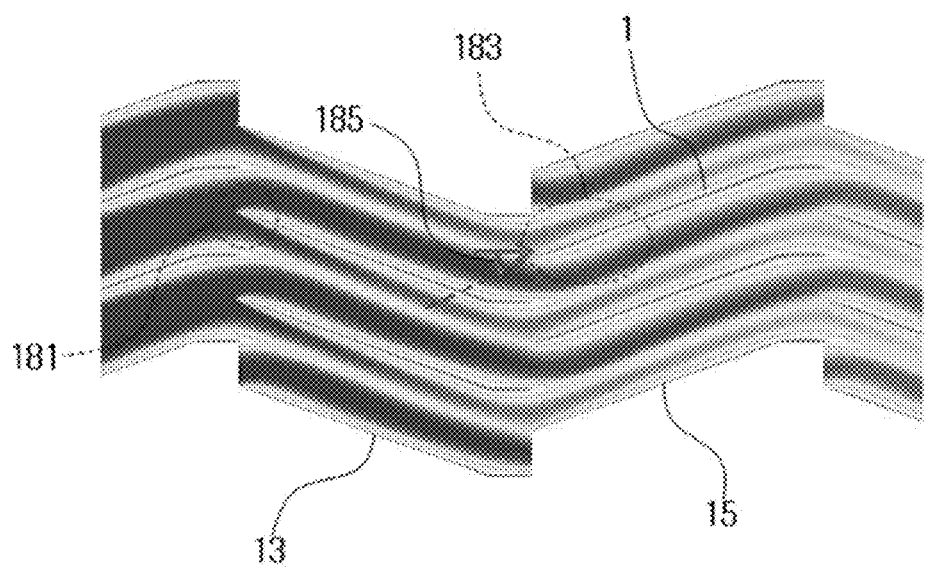

FIGS. 17 and 18 are views for explaining the heat transfer performance of the wavy fin according to the third embodiment of the present invention. FIG. 17(e) illustrates a temperature distribution when a fluid flows in the wavy fin 100 according to the third embodiment of the present invention illustrated in FIGS. 14(E) and 15. FIG. 18 is an enlarged view illustrating a portion of the temperature distribution when the fluid flows in the wavy fin 100 according to the third embodiment illustrated in FIG. 17(e). As illustrated in the drawings, in the wavy fin 100 according to the third embodiment of the present invention, a fluid, which is distant from any side part 1 and flows without contact therewith, comes into direct contact with the side part 1 in an offset structure 181 formed in the associated valley or ridge 11. Thus, it can be seen that heat exchange is more actively performed in the wavy fin 100 according to the third embodiment, when compared with the temperature distribution in the herringbone wavy fin illustrated in FIG. 7(a). In addition, in the first embodiment described with reference to FIGS. 5 to 8, the recirculation zone 83 is generated due to the great angle of attack 85. Thus, after the fluid undergoes sufficient heat exchange in the recirculation zone 83, heat exchange is performed in other zones. However, according to the third embodiment, the size of a recirculation zone 183 is reduced since an angle of attack 185 formed by the flow of fluid in the front part 13 and the side part 1 in the rear part 15 is reduced by the reduction part 17. Thus, it can be seen that heat exchange is more actively performed in the third embodiment. Therefore, it can be seen that the wavy fin 100 according to the third embodiment has higher heat transfer performance than the herringbone wavy fin according to the first embodiment illustrated in FIGS. 5(A) and 7(a).

FIG. 19 is a graph for explaining heat transfer performance depending on a flow of fluid in the wavy fin according to the third embodiment of the present invention. Referring to Graph (V), the Nusselt Number (Nu) in the herringbone wavy fin 100 according to the third embodiment is increased by 29% at a Re of 100, 50% at a Re of 200, 60% at a Re of 300, and 66% at a Re of 400, compared to that in the herringbone wavy fin illustrated in FIG. 5(A). On the other hand, referring to Graph (VI), the pressure drop (f) in the herringbone wavy fin 100 according to the third embodiment is increased by 21% at a Re of 100, 32% at a Re of 200, 38% at a Re of 300, and 41% at a Re of 400, compared to that in the herringbone wavy fin illustrated in FIG. 5(A). In addition, it can be seen that a lower pressure drop occurs in the wavy fin 100 according to the third embodiment than that according to the first embodiment. This is because the recirculation zone 183 of the third embodiment is smaller than the recirculation zone 83 of the first embodiment.

Figure 20:
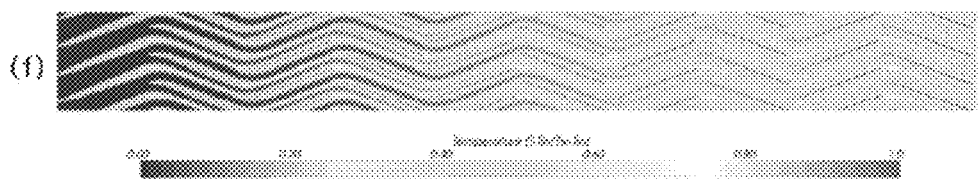
FIGS. 20 and 21 are views for explaining the heat transfer performance of the wavy fin according to the fourth embodiment of the present invention.
Figure 21:
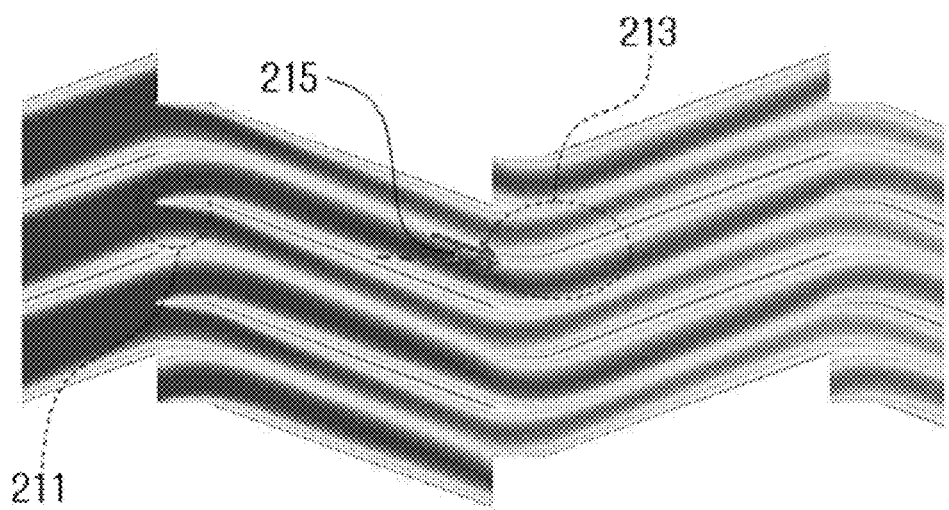

FIGS. 20 and 21 are views for explaining the heat transfer performance of the wavy fin according to the fourth embodiment of the present invention. FIG. 20(f) illustrates a temperature distribution when a fluid flows in the wavy fin 100 according to the fourth embodiment illustrated in FIGS. 14(F) and 16. FIG. 21 is an enlarged view illustrating a portion of the temperature distribution when the fluid flows in the wavy fin 100 according to the fourth embodiment illustrated in FIG. 20(f).

As illustrated in the drawings, in the wavy fin 100 according to the fourth embodiment of the present invention, a fluid, which is distant from any side part 1 and flows without contact therewith, comes into direct contact with the side part 1 in an offset structure 211 formed in the associated valley or ridge 11. Thus, it can be seen that heat exchange is more actively performed in the wavy fin 100 according to the fourth embodiment, when compared with the temperature distribution in the herringbone wavy fin illustrated in FIG. 7(a). In addition, in the first embodiment described with reference to FIGS. 5 to 8, the recirculation zone 83 is generated due to the great angle of attack 85. Thus, after the fluid undergoes sufficient heat exchange in the recirculation zone 83, heat exchange is performed in other zones. However, according to the fourth embodiment, the size of a recirculation zone 213 is reduced since an angle of attack 215 formed by the flow of fluid in the front part 13 and the side part 1 in the rear part 15 is reduced by the reduction part 17. Thus, it can be seen that heat exchange is more actively performed in the fourth embodiment compared to the first embodiment. Therefore, it can be seen that the wavy fin 100 according to the fourth embodiment has higher heat transfer performance than the herringbone wavy fin according to the first embodiment illustrated in FIGS. 5(A) and 7(a).

FIG. 22 is a graph for explaining heat transfer performance depending on a flow of fluid in the wavy fin according to the fourth embodiment of the present invention. Referring to Graph (VII), the Nusselt Number (Nu) in the herringbone wavy fin 100 according to the fourth embodiment is increased by 33% at a Re of 100, 57% at a Re of 200, 68% at a Re of 300, and 74% at a Re of 400, compared to that in the herringbone wavy fin illustrated in FIG. 5(A). On the other hand, referring to Graph (VIII), the pressure drop (f) in the wavy fin 100 according to the fourth embodiment is increased by 23% at a Re of 100, 34% at a Re of 200, 39% at a Re of 300, and 40% at a Re of 400, compared to that in the herringbone wavy fin illustrated in FIG. 5(A). In addition, it can be seen that a lower pressure drop occurs in the wavy fin 100 according to the fourth embodiment than that according to the first embodiment. This is because the recirculation zone 213 of the fourth embodiment is smaller than the recirculation zone 83 of the first embodiment.

Figure 23:
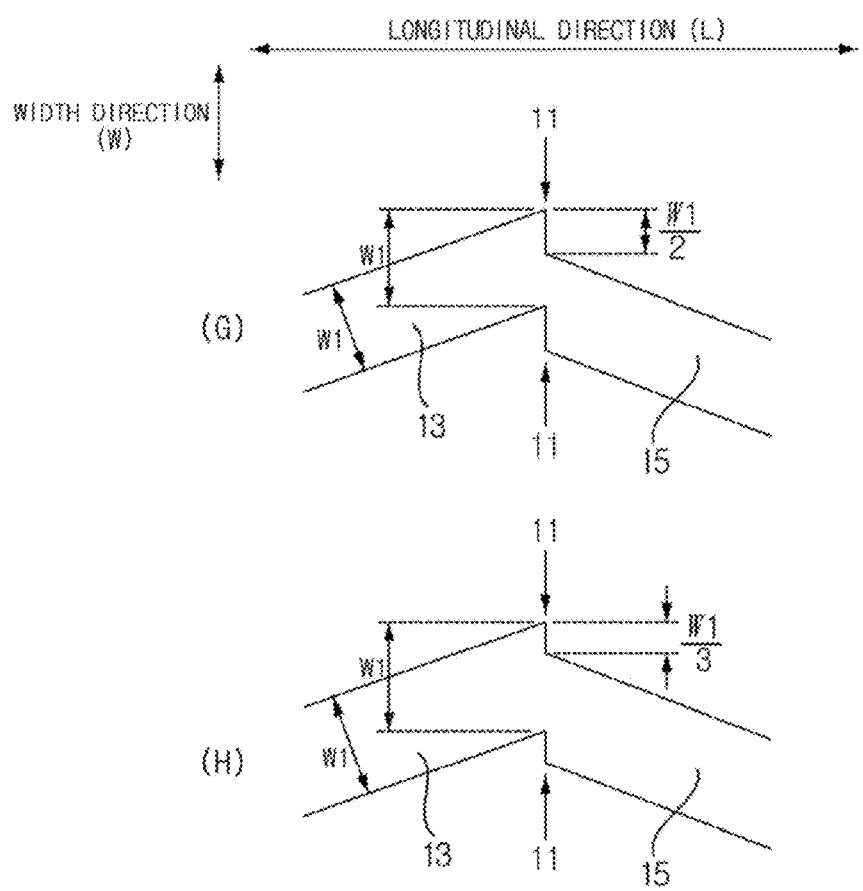
FIG. 23 is a view for explaining wavy fins according to fifth and sixth embodiments of the present invention.

Meanwhile, according to the present invention, the degree of offset in the wavy fin 100 may be adjusted. Embodiments in which the degree of offset is adjusted will be described. First, fifth and sixth embodiments of the present invention will be described. The fifth and sixth embodiments are based on the wavy fin 100 of the first embodiment. FIG. 23 is a view for explaining the fifth and sixth embodiments of the present invention.

FIGS. 23(G) and 23(H) illustrate a portion of the longitudinal cross-section of each unit fin 10. Here, FIG. 23(G) illustrates a wavy fin 100 according to the fifth embodiment, and FIG. 23(H) illustrates a wavy fin 100 according to the sixth embodiment. Reference symbol W1 refers to the width between a pair of side parts 1 of the unit fin 10. According to the present invention, the degree of offset may be adjusted within the width W1 of the unit fin 10. That is, the degree of offset is determined using the following Equation 1:

$$\frac{W1}{x},$$ [Equation 1]

where W1 is a width between a pair of side parts 1 of a unit fin 10, and x is a positive integer.

According to the fifth embodiment, one of front and rear parts 13 and 15 is offset from the other by W1/2. For example, similar to the first embodiment, the rear part 15 may be offset from the front part 13 by W1/2 in a width direction in the fifth embodiment, as illustrated in FIG. 23(G).

According to the sixth embodiment, one of front and rear parts 13 and 15 is offset from the other by W1/3. For example, the rear part 15 may be offset from the front part 13 by W1/3 in a width direction, as illustrated in FIG. 23(H).

Figure 24:
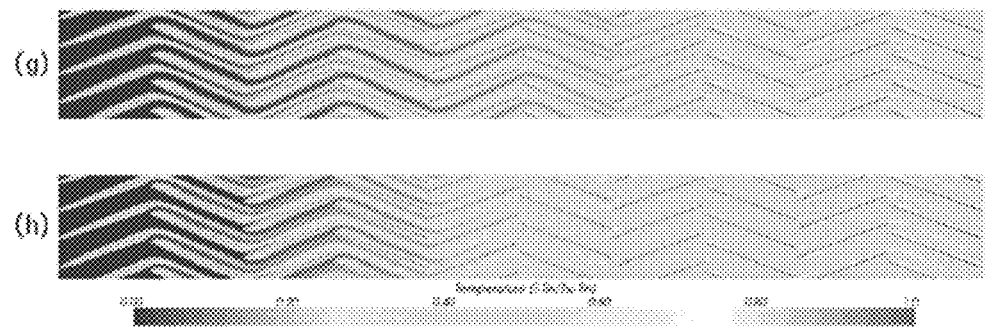
FIG. 24 is a view for explaining the heat transfer performance of the wavy fins according to the fifth and sixth embodiments of the present invention.

FIG. 24 is a view for explaining the heat transfer performance of the wavy fins according to the fifth and sixth embodiments of the present invention. FIG. 24(g) illustrates a temperature distribution when a fluid flows in the wavy fin 100 according to the fifth embodiment illustrated in FIG. 23(G). FIG. 24(h) illustrates a temperature distribution when a fluid flows in the wavy fin 100 of the sixth embodiment illustrated in FIG. 23(H). When compared with the temperature distribution in the herringbone wavy fin illustrated in FIG. 7(a), owing to offset structures in the wavy fins 100 according to the fifth and sixth embodiments of the present invention, a fluid, which is distant from any side part 1 and flows without contact therewith, comes into direct contact with the side part 1 in the offset structure formed in the associated valley or ridge 11. Thus, heat exchange is more actively performed in the wavy fins 100 according to the fifth and sixth embodiments, when compared with the temperature distribution in the herringbone wavy fin illustrated in FIG. 7(a). Therefore, it can be seen that the wavy fin 100 according to the fifth embodiment has higher heat transfer performance than the herringbone wavy fin illustrated in FIG. 7(a). In addition, it can be seen that the wavy fin 100 according to the sixth embodiment has higher heat transfer performance than the wavy fin according to the fifth embodiment. According to the fifth embodiment, the flow of fluid is symmetrically divided by the side part 1 having a structure that is offset by W1/2. On the other hand, according to the sixth embodiment, the flow of fluid is asymmetrically divided by the side part 1 having a structure that is offset by W1/3. Thus, since it is advantageous for the fluid to pass several times through the offset structure, the amount of fluid that comes into direct contact with the side part 1 one or more times is larger in the sixth embodiment, in which the flow of fluid is asymmetrically divided, than in the fifth embodiment. Therefore, the wavy fin 100 according to the sixth embodiment has higher heat transfer performance than that of the fifth embodiment.

FIG. 25 is a graph for explaining heat transfer performance depending on a flow of fluid in the wavy fins according to the fifth and sixth embodiments of the present invention. Referring to Graph (IX), it can be seen that the Nusselt Number (Nu) in the wavy fin 100 according to the fifth embodiment illustrated in FIG. 23(G) is increased by 30% at a Re of 100, 52% at a Re of 200, 64% at a Re of 300, and 74% at a Re of 400, compared to that in the herringbone wavy fin illustrated in FIG. 5(A). In addition, it can be seen that the Nusselt Number (Nu) in the wavy fin 100 according to the sixth embodiment illustrated in FIG. 23(H) is increased by 34% at a Re of 100, 62% at a Re of 200, 80% at a Re of 300, and 92% at a Re of 400, compared to that in the herringbone wavy fin illustrated in FIG. 5(A).

On the other hand, referring to Graph (X), the pressure drop (f) in the wavy fin 100 according to the fifth embodiment is increased by 35% at a Re of 100, 53% at a Re of 200, 66% at a Re of 300, and 76% at a Re of 400, compared to that in the herringbone wavy fin illustrated in FIG. 5(A). In addition, the pressure drop (f) in the wavy fin 100 according to the sixth embodiment is increased by 28% at a Re of 100, 44% at a Re of 200, 59% at a Re of 300, and 70% at a Re of 400, compared to that in the herringbone wavy fin illustrated in FIG. 5(A). This pressure drop occurs due to the generation of the recirculation zone, as described above.

Figure 26:
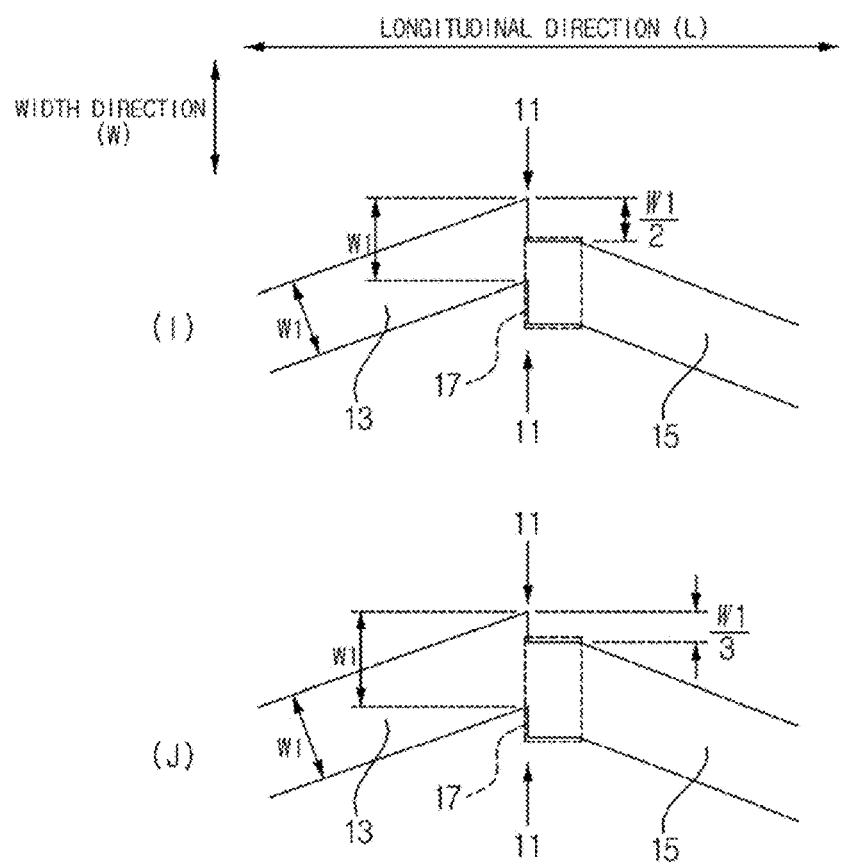
FIG. 26 is a view for explaining wavy fins according to seventh and eighth embodiments of the present invention.

Next, seventh and eighth embodiments of the present invention will be described. The seventh and eighth embodiments are based on the fourth embodiment. FIG. 26 is a view for explaining wavy fins according to the seventh and eighth embodiments of the present invention.

FIGS. 26(I) and 26(J) illustrate a portion of the longitudinal cross-section of each unit fin 10. Here, FIG. 26(I) illustrates a wavy fin 100 according to the seventh embodiment, and FIG. 26(J) illustrates a wavy fin 100 according to the eighth embodiment. Here, reference symbol W1 refers to the width of the unit fin 10. According to the present invention, the degree of offset may be adjusted within the width W1 of the unit fin 10.

According to the seventh embodiment, one of front and rear parts 13 and 15 is offset from the other by W1/2. For example, similar to the fourth embodiment, the rear part 15 may be offset from the front part 13 by W1/2 in a width direction, as illustrated in FIG. 26(I).

According to the eighth embodiment, one of front and rear parts 13 and 15 is offset from the other by W1/3. For example, the rear part 15 may be offset from the front part 13 by W1/3 in a width direction, as illustrated in FIG. 26(J).

Figure 27:
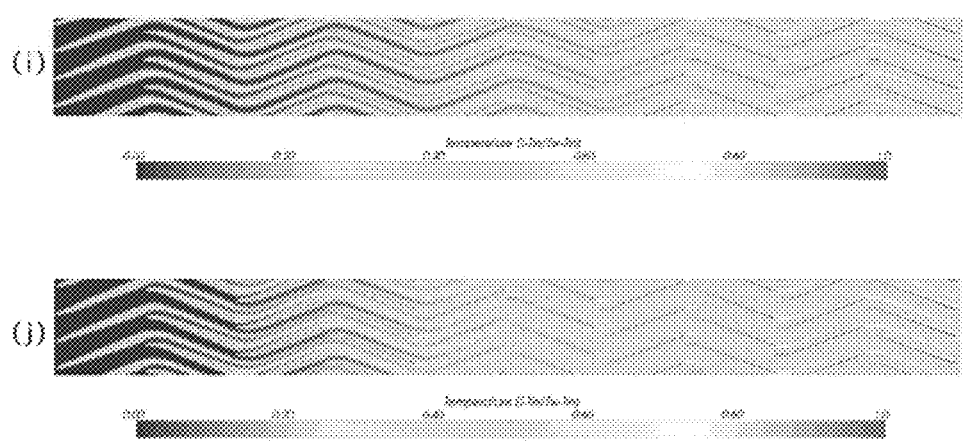
FIG. 27 is a view for explaining the heat transfer performance of the wavy fins according to the seventh and eighth embodiments of the present invention.

FIG. 27 is a view for explaining the heat transfer performance of the wavy fins according to the seventh and eighth embodiments of the present invention. FIG. 27(i) illustrates a temperature distribution when a fluid flows in the wavy fin 100 according to the seventh embodiment. FIG. 27(j) illustrates a temperature distribution when a fluid flows in the wavy fin 100 of the eighth embodiment. When compared with the temperature distribution in the herringbone wavy fin illustrated in FIG. 7(a), owing to offset structures in the wavy fins 100 according to the seventh and eighth embodiments of the present invention, heat exchange is more actively performed in a valley or ridge 11. In addition, the wavy fins 100 according to the seventh and eighth embodiments have higher heat exchange performance than that of the first embodiment, since the size of a recirculation zone is reduced in the valley or ridge 11 by a reduction part 17. Moreover, it can be seen that the wavy fin according to the eighth embodiment has higher heat exchange performance than the wavy fin according to the seventh embodiment, due to the asymmetric offset described above. Therefore, it can be seen that the wavy fin 100 according to the seventh embodiment has higher heat transfer performance than the herringbone wavy fin according to the first embodiment illustrated in FIG. 7(a). In addition, it can be seen that the wavy fin 100 according to the eighth embodiment has higher heat transfer performance than the wavy fin according to the seventh embodiment.

FIG. 28 is a graph for explaining heat transfer performance depending on a flow of fluid in the wavy fins according to the seventh and eighth embodiments of the present invention. Referring to Graph (XI), the Nusselt Number (Nu) in the wavy fin 100 according to the seventh embodiment is increased by 33% at a Re of 100, 57% at a Re of 200, 68% at a Re of 300, and 74% at a Re of 400, compared to that in the herringbone wavy fin illustrated in FIG. 5(A). In addition, it can be seen that the Nusselt Number (Nu) in the wavy fin 100 according to the eighth embodiment is increased by 36% at a Re of 100, 67% at a Re of 200, 85% at a Re of 300, and 97% at a Re of 400, compared to that in the herringbone wavy fin illustrated in FIG. 5(A).

On the other hand, referring to Graph (XII), the pressure drop (f) in the wavy fin 100 according to the seventh embodiment is increased by 23% at a Re of 100, 34% at a Re of 200, 39% at a Re of 300, and 40% at a Re of 400, compared to that in the herringbone wavy fin illustrated in FIG. 5(A). In addition, the pressure drop (f) in the wavy fin 100 according to the eighth embodiment is increased by 16% at a Re of 100, 27% at a Re of 200, 35% at a Re of 300, and 39% at a Re of 400, compared to that in the herringbone wavy fin illustrated in FIG. 5(A).

As described above, it can be seen that the wavy fins 100 according to the first to eighth embodiments have higher heat transfer performance than a typical wavy fin. However, it can be seen that the pressure drop (f) is also increased in proportion to the increase in heat transfer performance. Hereinafter, the heat transfer performance in consideration of the pressure drop (f) in the wavy fin 100 according to each embodiment of the present invention will be described.

Figure 29:
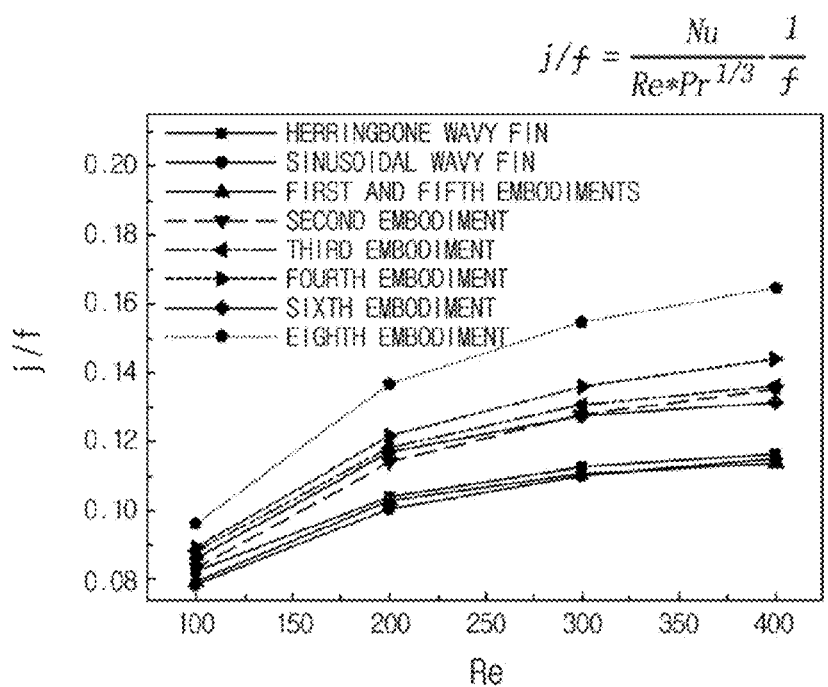
FIG. 29 is a graph for explaining heat transfer performance in consideration of the pressure drop in the wavy fin according to each embodiment of the present invention.

FIG. 29 is a graph for explaining the heat transfer performance in consideration of the pressure drop in the wavy fin according to each embodiment of the present invention. The graph of FIG. 29 illustrates the heat transfer performance depending on the pressure drop (f) in each of the herringbone wavy fin of FIG. 5(A), the sinusoidal wavy fin of FIG. 9(C), and the wavy fins 100 according to the embodiments of the present invention. As illustrated in the drawing, it can be seen that the wavy fins 100 according to the embodiments of the present invention have higher heat transfer performance than the herringbone wavy fin of FIG. 5(A) or the sinusoidal wavy fin of FIG. 9(C), regardless of the increase in pressure drop (f).

Meanwhile, the wavy fin 100 according to each of the first to eighth embodiments of the present invention may be manufactured through an additive manufacturing (AM) method. "Additive manufacturing method" means three-dimensional printing (3DP). Hereinafter, the method of manufacturing the wavy fin 100 of the present invention will be described.

Figure 30:
FIG. 30 is a block diagram illustrating the configuration of a system for manufacturing a wavy fin according to an embodiment of the present invention.

First, a system for manufacturing a wavy fin according to an embodiment of the present invention will be described. FIG. 30 is a block diagram illustrating the configuration of the system for manufacturing a wavy fin according to the embodiment of the present invention.

Referring to FIG. 30, the system for manufacturing a wavy fin includes a modeling apparatus 300 and an additive manufacturing apparatus 400. The modeling apparatus 300 serves to form the wavy fin 100 according to the embodiment of the present invention as a three-dimensional image. The form in which the wavy fin 100 is formed as the three-dimensional image is referred to as a wavy fin model. The modeling apparatus 300 generates a three-dimensional wavy fin model. The modeling apparatus 300 may then transfer the generated wavy fin model to the additive manufacturing apparatus 400. The modeling apparatus 300 is an apparatus which has a general-purpose processor or an image processor and performs computing, and may form the wavy fin according to each of the first to eighth embodiments as a three-dimensional wavy fin model using the general-purpose processor or the image processor. Typically, the modeling apparatus 300 may be, for example, a computer. Moreover, the modeling apparatus 300 may be, for example, a notebook, a smart phone, a tablet PC, a phablet PC, or a PDA.

The additive manufacturing apparatus 400 receives the three-dimensional wavy fin model from the modeling apparatus 300, and manufactures a wavy fin depending on the wavy fin model using an additive manufacturing (AM) technique. Typically, the additive manufacturing apparatus 400 may be a so-called 3D printer.

Although the modeling apparatus 300 and the additive manufacturing apparatus 400 are described to be independent apparatuses, the present invention is not limited thereto. The modeling apparatus 300 and the additive manufacturing apparatus 400 may be integrated as one apparatus. For example, the modeling apparatus 300 may be merged with the additive manufacturing apparatus 400 so as to be realized as the dedicated device of the additive manufacturing apparatus 400. In addition, at least some functions of each of the apparatuses 300 and 400 may also be realized by other devices. In addition, for 3D printing, the wavy fin model as a three-dimensional image is sliced so as to be divided into a plurality of layers, coordinates (e.g. G-code) for positions to be actually output from the respective layers are derived, the layers are output in turn according to the derived coordinates (G-code), and the output layers are laminated. The above process of slicing the wavy fin model may be executed in the modeling apparatus 300 or the additive manufacturing apparatus 400.

Figure 31:
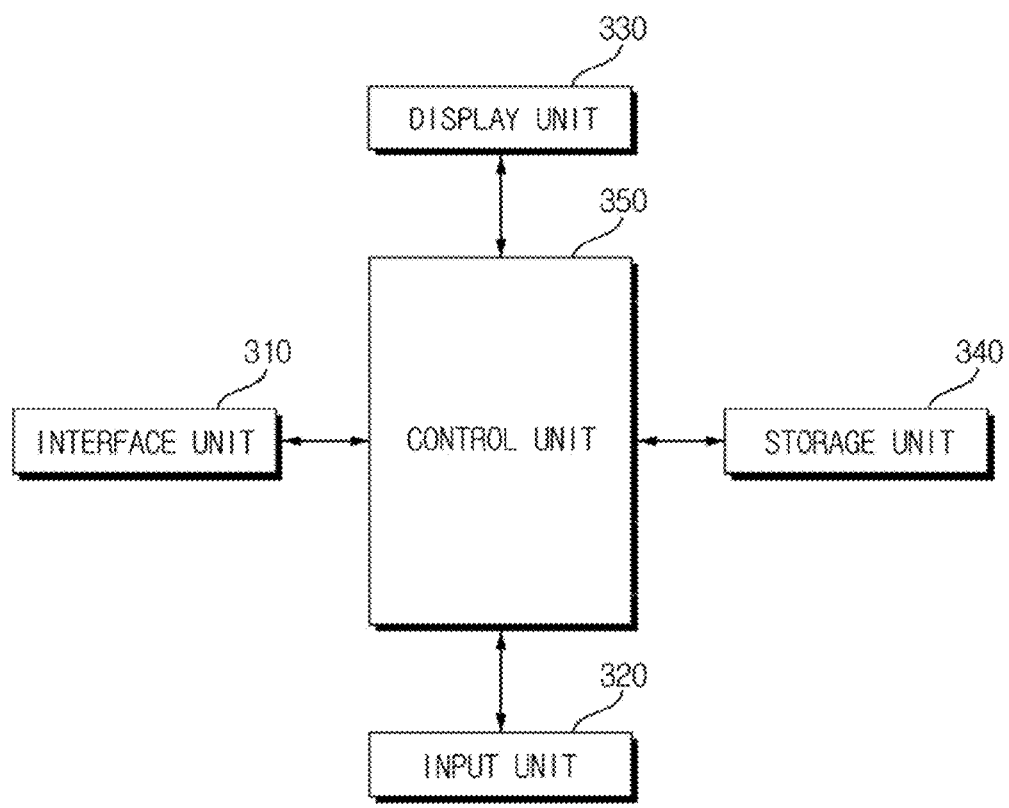
FIG. 31 is a block diagram illustrating the configuration of a modeling apparatus according to an embodiment of the present invention.

Hereinafter, the modeling apparatus 300 according to the embodiment of the present invention will be described in more detail. FIG. 31 is a block diagram illustrating the configuration of the modeling apparatus according to the embodiment of the present invention.

The modeling apparatus 300 according to the embodiment of the present invention is an apparatus which is capable of performing computing such as image processing. Referring to FIG. 31, the modeling apparatus 300 according to the embodiment of the present invention includes an interface unit 310, an input unit 320, a display unit 330, a storage unit 340, and a control unit 350.

The interface unit 310 serves to interface with the additive manufacturing apparatus 400. The interface unit 310 may consist of a USB port, a serial port, a parallel port, a data bus, etc. The interface unit 310 may receive a three-dimensional wavy fin model from the control unit 350, and provide the same to the additive manufacturing apparatus 400.

The input unit 320 receives key operations for controlling various functions and operations of the modeling apparatus 300 from a user, generates input signals, and transmits the signals to the control unit 350. The input unit 320 may be, for example, a keyboard or a mouse. The input unit 320 may include at least one of a power key for power on/off, a letter key, a numeric key, and an arrow key. When the display unit 330 is embodied as a touch screen, the function of the input unit 320 may be performed in the display unit 330. When all functions are performed only in the display unit 330, the input unit 320 may also be omitted.

The display unit 330 receives data from the control unit 350 of the modeling apparatus 300 so as to display the received data on a screen. Particularly, the wavy fin 300 according to the embodiment of the present invention may be displayed as a three-dimensional image. In addition, the display unit 330 may visually provide a user with information on menu, data, and function setting of the modeling apparatus 300, and other various types of information. When the display unit 330 is formed as a touch screen, the display unit 330 may replace and perform a portion or the entirety of the functions of the input unit 320. The display unit 330 may be embodied as an LCD (Liquid Crystal Display), an OLED (Organic Light Emitting Diode), an AMOLED (Active Matrix Organic Light Emitting Diode), or the like.

The storage unit 340 serves to store various types of data and applications required to operate the modeling apparatus 300, and various types of data generated depending on the operation of the modeling apparatus 300. The storage unit 340 may largely include a program region and a data region. An OS (Operating System) for the booting and operation of the modeling apparatus 300, an application program for executing a simulation to verify the heat exchange performance of the wavy fin according to the embodiment of the present invention, etc may be stored in the program region. The three-dimensional image of the wavy fin 100 may be stored in the data region. The various types of data stored in the storage unit 340 may be removed, changed, or added according to user's operation.

The control unit 350 may control the overall operation of the modeling apparatus 300 and signal flows between the blocks in the modeling apparatus 300, and may perform a data processing function to process data. The control unit 350 may be a CPU (Central Processing Unit), an application processor, a GPU (Graphic Processing Unit), or the like.

Basically, the control unit 350 allows the wavy fin 100 according to the embodiment of the present invention to be generated as a three-dimensional wavy fin model, and performs a simulation using the same. In addition, the control unit 350 allows the generated wavy fin model to be transferred to the additive manufacturing apparatus 400 through the interface unit 310, so that the additive manufacturing apparatus 400 manufactures the wavy fin 100 according to the wavy fin model in an additive manufacturing manner. The operation of the control unit 350 will be described below in more detail.

Figure 32:
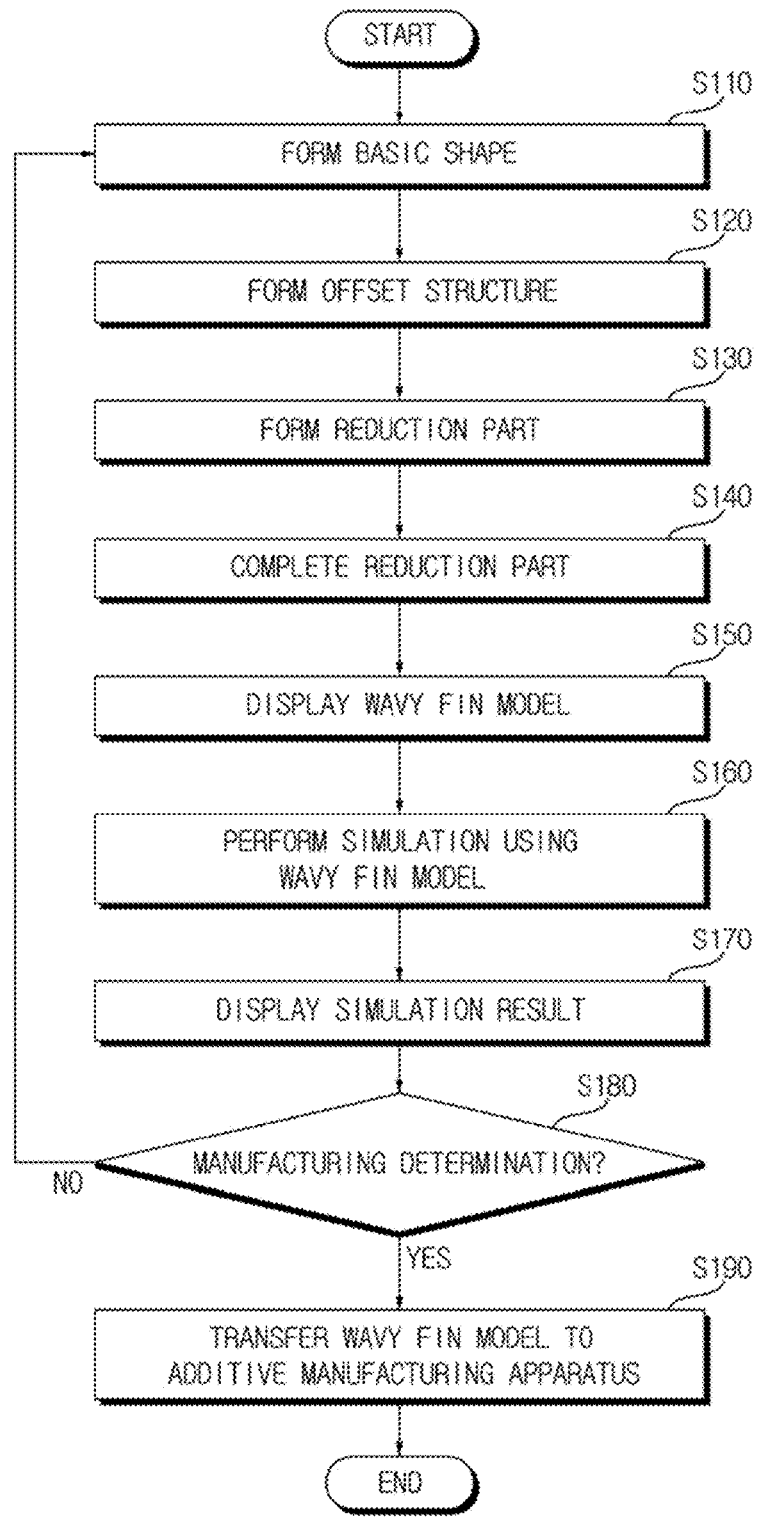
FIG. 32 is a flowchart illustrating a method of forming a wavy fin model in a method of manufacturing a wavy fin according to an embodiment of the present invention.

Next, a method of manufacturing a wavy fin according to an embodiment of the present invention will be described. First, a method of forming a three-dimensional wavy fin model according to an embodiment of the present invention will be described. FIG. 32 is a flowchart illustrating the method of forming a wavy fin model in the method of manufacturing a wavy fin according to the embodiment of the present invention.

In the embodiment illustrated in FIG. 32, a three-dimensional wavy fin model, which has the actual size of the wavy fin 100, is formed. To this end, the control unit 350, first, allows the basic shape of the wavy fin model, which is the three-dimensional image of one wavy fin 100, to be formed in response to the input from the user through the input unit 320, in step S110. The basic shape is formed by setting the overall size of the wavy fin 100, the size of the unit fin 10, and the wave shape. The overall size of the wavy fin 100 includes a length, a width, and a height, as illustrated in FIG. 1. A plurality of wavy fins 100 may be used in one heat exchanger, and the overall size of one of the wavy fins 100 is set depending on the types and designs of heat exchangers in the present step. The size of the unit fin 10 includes a height, a length, and a width W1 thereof. The height and length of the unit fin 10 are equal to the overall height H and length L of the wavy fin 100. Accordingly, it is possible to set a width W1, which is the distance between the adjacent side parts 1 of the unit fin 10, and a width W2, which is the distance between adjacent unit fins 10, in the present step. As described above, the wavy fin 100 is configured to form a wave such that the valleys and ridges 11 are repeated in the longitudinal direction, and this wave shape may be determined in the present step. Here, the wave shape includes a herringbone shape and a sinusoidal shape.

Next, the control unit 350 allows an offset structure to be formed in the basic shape, in response to the input from the user through the input unit 320, in step S120. Here, when the offset structure is formed, the target of offset, the direction of offset, and the degree of offset are set according to the user's input. That is, through setting of the target of offset, it is determined whether the rear part 15 is offset from the front part 13 or whether the front part 13 is offset from the rear part 15, on the basis of the valley or ridge 11. Through setting of the direction of offset, it is determined whether the target of offset is offset to the left in the width direction or whether the target of offset is offset to the right in the width direction. Through setting of the degree of offset, it is determined whether the target of offset is offset to some degree. Here, the degree of offset is adjusted within the width W1 between the pair of side parts 1 of the unit fin 10. That is, the degree of offset is determined using the above-mentioned Equation 1. In Equation 1, since the width W1 between the pair of side parts 1 is determined in step S110, only an x value is set in step S120. For example, when the x value is input as "2" through the input unit 320, the degree of offset is determined as W1/2 as in the fifth embodiment. When the x value is input as "3" through the input unit 320, the degree of offset is determined as W1/3 as in the sixth embodiment.

Next, the control unit 350 allows the reduction part 17 to be formed in response to the input from the user through the input unit 320, in step S130. The setting of the reduction part 17 means whether or not to form the reduction part 17, and means setting the position and length of the reduction part 17 if the reduction part 17 is formed. When the reduction part 17 is formed, it may be determined whether the reduction part 17 is formed immediately in front of (in the front of) the valley or ridge 11 or whether the reduction part 17 is formed immediately beyond (in the rear of) the valley or ridge 11, through the position setting of the reduction part 17. In addition, the length L1 of the reduction part 17 may be set through the length setting of the reduction part 17, as illustrated in FIGS. 15 and 16.

When the above steps (S110 to S130) are completed, the control unit 350 allows the wavy fin model, in which the outer shape of one of the wavy fins 100 according to the first to eighth embodiments is formed as a three-dimensional image, to be completed, in step S140. Next, the control unit 350 allows the formed wavy fin model to be displayed on the screen through the display unit 330, in step 3150.

Meanwhile, although the wavy fin model, which is the three-dimensional image of the wavy fin 100, is described to be displayed on the screen in step S150, the present invention is not limited thereto. For example, when each of the above steps (S110, S120, and S130) is completed, the three-dimensional wavy fin model may be displayed on the screen through the display unit 330 for each step. In this case, if there are no input values, the wavy fin model may be formed using default values. The user checks the wavy fin model through the screen, and may perform input for setting values again, if necessary.

Next, the control unit 350 performs a simulation for the heat exchange performance of the wavy fin 100 using the wavy fin model, in step S160. The simulation serves to derive heat exchange performance in such a manner that an imaginary fluid flows in the wavy fin model in the longitudinal direction. According to this simulation, it is possible to derive a temperature distribution, heat transfer performance, and a pressure drop. Accordingly, the control unit 350 allows a simulation result to be displayed on the screen through the display unit 330, in step S170. The simulation result includes a temperature distribution, heat transfer performance, and the size of pressure drop. For example, the temperature distribution depending on the flow of fluid may be displayed on the screen. These examples are illustrated in FIGS. 7, 8, 12, 17, 18, 20, 21, 24, and 27. In addition, the heat transfer performance and the size of pressure drop depending on the flow of fluid may be displayed in the graph. These examples are illustrated in FIGS. 9, 13, 19, 22, 25, and 28.

The user, which checks the simulation result through the screen, may determine whether to manufacture the wavy fin 100 according to the corresponding wavy fin model, or whether to form another wavy fin model through resetting.

When the command for resetting is input to the control unit 350 through the input unit 320 in step S180, the process returns to step S110 and the above steps (S110 to S180) may be repeated. On the other hand, when the command for manufacturing is input to the control unit 350 through the input unit 320 in step S180, the process proceeds to step S190 and the above-formed wavy fin model is transferred to the additive manufacturing apparatus 400 through the interface unit 310.

Figure 33:
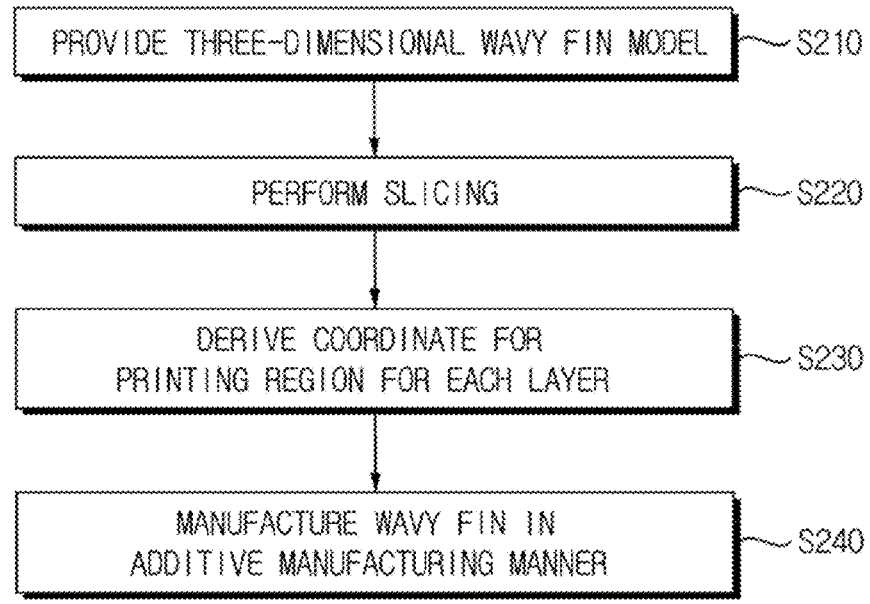
FIG. 33 is a flowchart illustrating the method of manufacturing a wavy fin according to the embodiment of the present invention.
Figure 34:
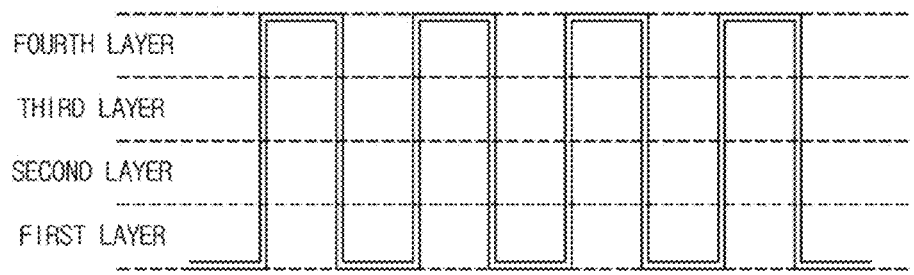
FIG. 34 is a view illustrating an exemplary screen for explaining the method of manufacturing a wavy fin according to the embodiment of the present invention.

Next, the method of manufacturing the wavy fin 100 (in the additive manufacturing manner) through 3D printing using the additive manufacturing apparatus 400 will be described. FIG. 33 is a flowchart illustrating the method of manufacturing a wavy fin according to the embodiment of the present invention. FIG. 34 is a view illustrating an exemplary screen for explaining the method of manufacturing a wavy fin according to the embodiment of the present invention.

Referring to FIG. 34, the additive manufacturing apparatus 400 provides a three-dimensional wavy fin model in step S210. For example, the wavy fin model may be preferably provided from the modeling apparatus 300. For another example, the wavy fin model may be provided through a network or other routes. The provided wavy fin model may be a three-dimensional image which has the same size as one of the wavy fins 100 according to the above-mentioned first to eighth embodiments.

Next, the additive manufacturing apparatus 400 performs slicing to divide the wavy fin model into a plurality of layers in step S220. FIG. 34 is a cross-sectional view in which the wavy fin model is sliced. As illustrated in the drawing, when the slicing is performed, the wavy fin model is divided into a plurality of layers (first to fourth layers). In the drawing, each of the layers is distinguished by the dotted line, and may be a basic output unit for additive manufacturing (3D printing). The size of each layer may vary according to the resolution of the additive manufacturing apparatus 400.

Next, the additive manufacturing apparatus 400 derives a coordinate for a printing region for each layer in step S230. As illustrated in FIG. 34, a region that is occupied by the wavy fin model and a region that is not occupied by the wavy fin model are present for each layer. Here, the region that is occupied by the wavy fin model is a region in which printing is performed, i.e. a printing region, and the region that is not occupied by the wavy fin model is a region in which printing is not performed.

Next, the additive manufacturing apparatus 400 sequentially each layer depending on the coordinate for the printing region of each layer, and manufactures the wavy fin 100 in an additive manufacturing manner in which the printed layers are laminated.

Meanwhile, the method of manufacturing a wavy fin, which includes the method of forming a wavy fin model described with reference to FIG. 32 and the method of manufacturing a wavy fin described with reference to FIG.

33, may be embodied as a variety of computer-readable programs and be recorded in computer-readable recording media. Here, the recording media may include program instructions, data files, data structures, and the like, alone or in any combination. The program instructions recorded in the recording media may be especially designed and constructed for the present invention, or be known to computer programmers skilled in the art to which the invention pertains so as to be usable. Examples of computer-readable media include magnetic media, such as hard disks, floppy disks, and magnetic tape, optical media, such as CD ROMs and DVDs, magneto-optical media such as floptical disks, and hardware devices that are specially configured to store and perform program instructions, such as read-only memory (ROM), random access memory (RAM), and flash memory. Examples of program instructions include machine code, such as produced by a compiler, and files containing higher level code that may be executed by the computer using an interpreter. These hardware devices may be configured to act as one or more software modules in order to perform the operations and methods described above, or vice versa.

As is apparent from the above description, in accordance with the present invention, it is possible to improve heat exchange performance by applying an offset structure to a wavy fin, and to further improve heat exchange performance by reducing the size of a recirculation zone, which is generated due to the offset structure, using a reduction part.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A wavy fin, in which a plurality of top and bottom parts forming ridges and valleys are alternately formed in a width direction while being connected by a plurality of side parts, and the top parts, the bottom parts, and the side parts extend in a longitudinal direction so as to form a wave such that ridges and valleys are alternately repeated, the wavy fin comprising:
    a front part as a region in front of each ridge or valley of the wave in the longitudinal direction; and
    a rear part as a region beyond the ridge or valley of the wave in the longitudinal direction,
    wherein the front and rear parts are offset from each other in the width direction so as to be misaligned at the ridge or valley of the wave, wherein one of the front and rear parts is offset from the other within a width between adjacent side parts, and wherein the wave has a herringbone shape or a sinusoidal shape.

2. The wavy fin according to claim 1, wherein one of the front and rear parts is offset from the other by ½ of a width between adjacent side parts.

3. The wavy fin according to claim 1, wherein one of the front and rear parts is offset from the other by ⅓ of a width between adjacent side parts.

* * * * *